(12) United States Patent
Kasahara et al.

(10) Patent No.: US 6,812,932 B2
(45) Date of Patent: *Nov. 2, 2004

(54) DETECTOR FOR DETECTING PSEUDO-CONTOUR NOISE AND DISPLAY APPARATUS USING THE DETECTOR

(75) Inventors: Mitsuhiro Kasahara, Hirakata (JP); Yuichi Ishikawa, Ibaraki (JP); Tomoko Morita, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 285 days.

This patent is subject to a terminal disclaimer.

(21) Appl. No.: 09/916,285

(22) Filed: Jul. 30, 2001

(65) Prior Publication Data

US 2002/0005857 A1 Jan. 17, 2002

Related U.S. Application Data

(62) Division of application No. 09/355,340, filed on Aug. 5, 1999.
(60) Provisional application No. PCT/JP98/05511, filed on Dec. 7, 1998.

(51) Int. Cl.[7] .............................................. G09G 3/28
(52) U.S. Cl. ........................................ 345/613; 345/63
(58) Field of Search .......................... 345/612, 63, 60, 345/690, 617, 613–614, 904, 905, 77, 88, 89, 204, 64, 37, 695, 694, 696, 698; 358/165, 166, 167; 348/742–747, 699–704, 154–155

(56) References Cited

U.S. PATENT DOCUMENTS 4,807,033 A * 2/1989 Keesen et al. ............... 348/616
5,757,343 A * 5/1998 Nagakubo .................... 345/63

(List continued on next page.)

FOREIGN PATENT DOCUMENTS

CA          2217177      10/1996
EP           707302       4/1996

(List continued on next page.)

OTHER PUBLICATIONS

An English Language Abstract of JP 8–286636.
A Partial English Language Translation of JP 9–258689.
A Partial English Language Translation of JP 10–39830.
A Partial English Language Translation of JP 9–102921.
A Partial English Language Translation of JP 9–171368.
"New Category Contour Noise Observed in Pulse–Width –Modulated Moving Image", T. Masuda et al., ITEJ Tech. Report, vol. 19, No. 2, IDY95–21, published on Jan. 19, 1995, with a partial English Language translation.
Partial English Language Translation of Paragraphs [0027] and [0028] of JP 9–102921.
English Language Abstract of JP 10–161590.

*Primary Examiner*—Michael Razavi
*Assistant Examiner*—Thu-Thao Havan
(74) *Attorney, Agent, or Firm*—Greenblum & Bernstein, P.L.C.

(57) ABSTRACT

A pseudo-contour noise detecting device for detecting pseudo-contour noise is provided. The pseudo-contour noise is embodied as contour lines appearing spuriously in a motion picture displayed such that a gradation display is performed by using a plurality of weighted subfields into which one field of an input image, including a plurality of pixels, is divided. The device includes a pseudo-contour noise calculating unit in which, a logic operation is performed, for each subfield, on each pixel of at least a portion of the input image using a value of the each pixel and values of at least one of the pixels surrounding the each pixel. Further, a value corresponding to an amount of pseudo-contour noise is calculated according to a number of subfields in which a difference is detected between the value of the each pixel and the values of the at least one of the pixels surrounding the each pixel.

19 Claims, 27 Drawing Sheets

U.S. PATENT DOCUMENTS

| | | | |
|---|---|---|---|
| 5,760,756 A | * 6/1998 | Kobayashi et al. | 345/87 |
| 5,787,206 A | * 7/1998 | Williams et al. | 382/237 |
| 5,790,095 A | * 8/1998 | Onodera et al. | 345/690 |
| 5,854,540 A | 12/1998 | Matsumoto et al. | |
| 6,008,793 A | 12/1999 | Shigeta | |
| 6,025,818 A | 2/2000 | Okano | |
| 6,034,664 A | 3/2000 | Ali-Santosa et al. | |
| 6,040,876 A | 3/2000 | Pettitt et al. | |
| 6,069,610 A | 5/2000 | Denda et al. | |
| 6,091,398 A | 7/2000 | Shigeta | |
| 6,097,358 A | 8/2000 | Hirakawa et al. | |
| 6,100,939 A | 8/2000 | Kougami et al. | |
| 6,115,011 A | 9/2000 | Sano et al. | |
| 6,144,364 A | 11/2000 | Otobe et al. | |
| 6,151,000 A | 11/2000 | Ohtaka et al. | |
| 6,215,469 B1 | 4/2001 | Mori et al. | |
| 6,262,700 B1 | 7/2001 | Ueoka | |
| 6,414,657 B1 | * 7/2002 | Kasahara et al. | 345/63 |
| 6,518,977 B1 | * 2/2003 | Naka et al. | 345/690 |

FOREIGN PATENT DOCUMENTS

| | | |
|---|---|---|
| EP | 0707302 | 4/1996 |
| EP | 714085 | 5/1996 |
| EP | 0714085 | 5/1996 |
| EP | 0720139 | 7/1996 |
| EP | 720139 | 7/1996 |
| EP | 0807919 | 11/1997 |
| EP | 0837441 | 4/1998 |
| JP | 8-146905 | 6/1996 |
| JP | 8286636 | 11/1996 |
| JP | 9102921 | 4/1997 |
| JP | 9171368 | 6/1997 |
| JP | 9258689 | 10/1997 |
| JP | 10-39830 | 2/1998 |
| JP | 10161590 | 6/1998 |
| WO | 96/31865 | 10/1996 |

* cited by examiner

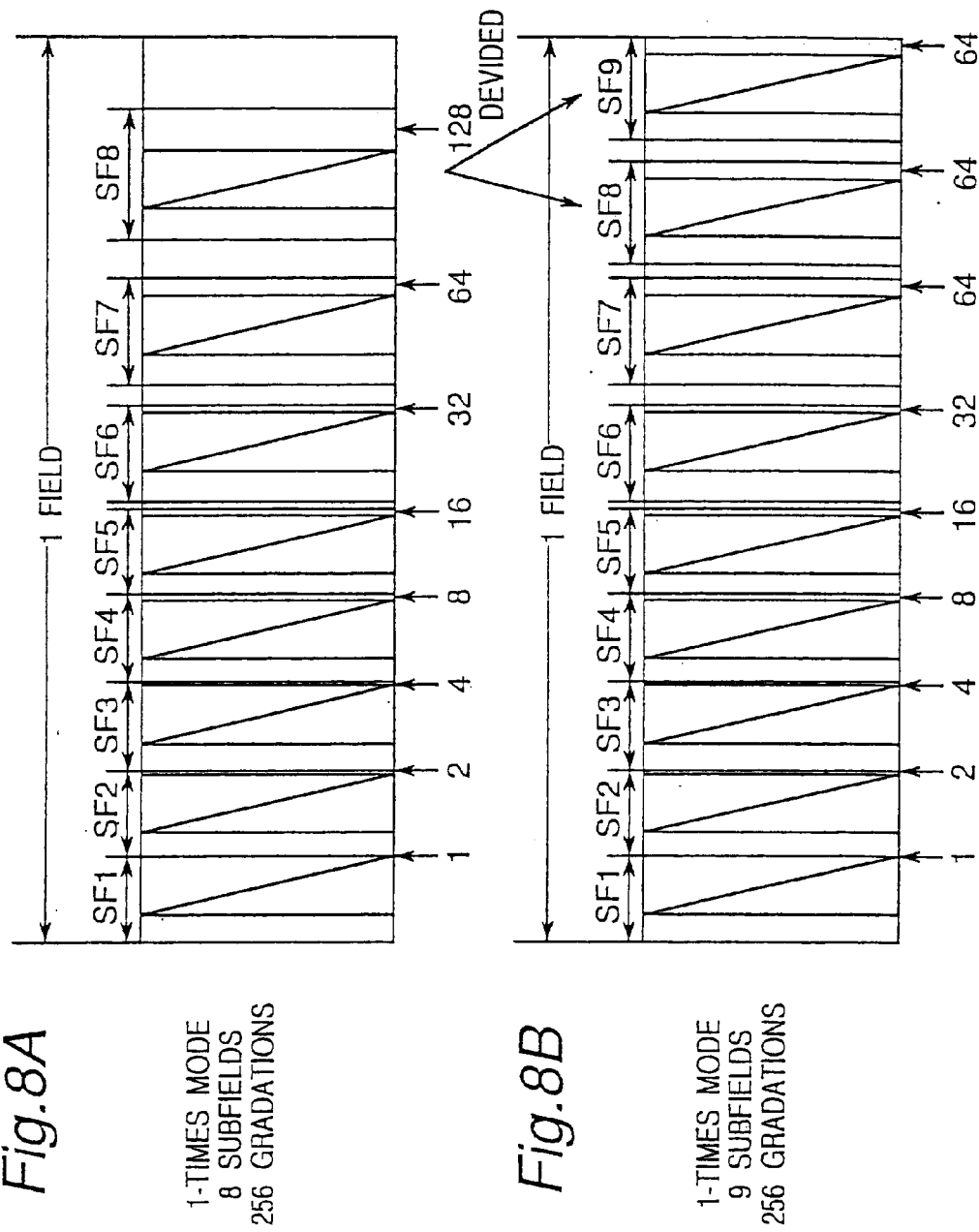

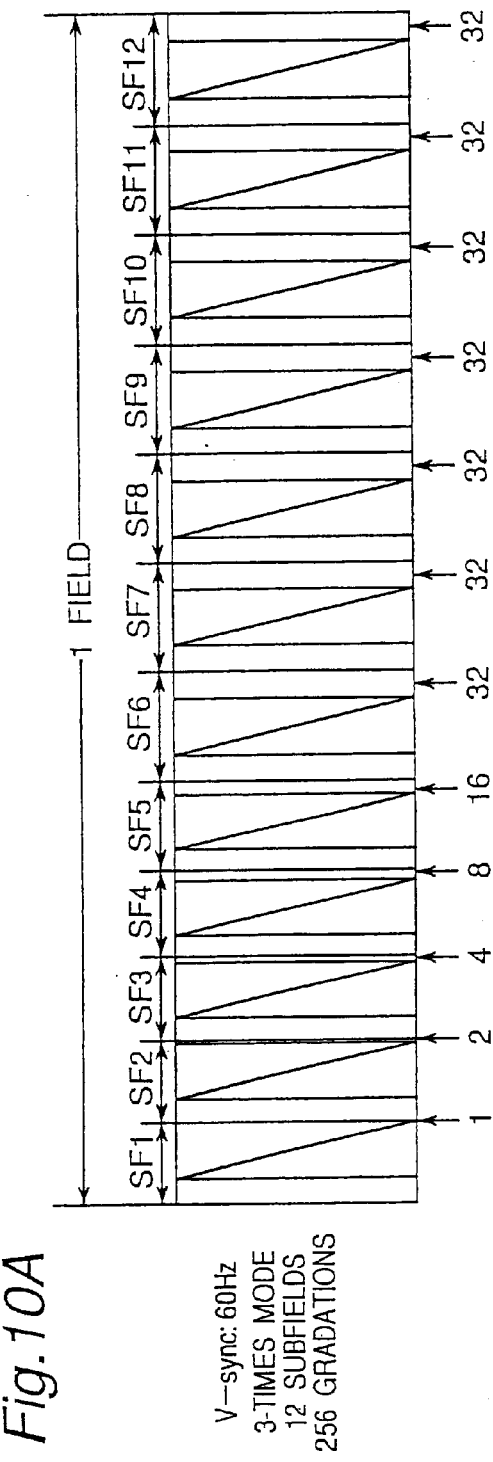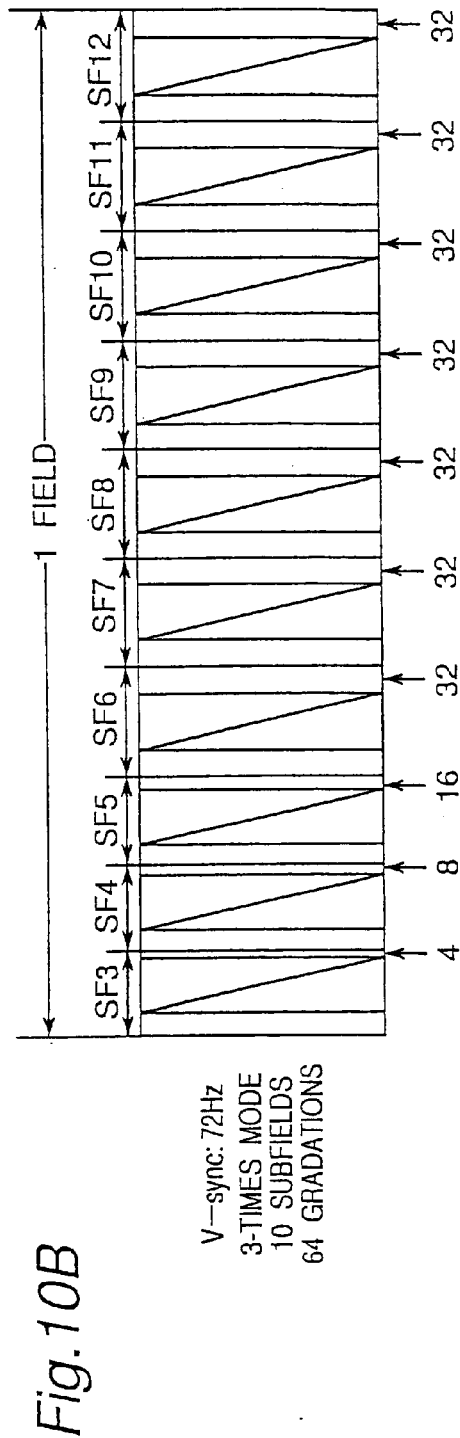
Fig.10A
V-sync: 60Hz
3-TIMES MODE
12 SUBFIELDS
256 GRADATIONS
Fig.10B
V-sync: 72Hz
3-TIMES MODE
10 SUBFIELDS
64 GRADATIONS Fig.27
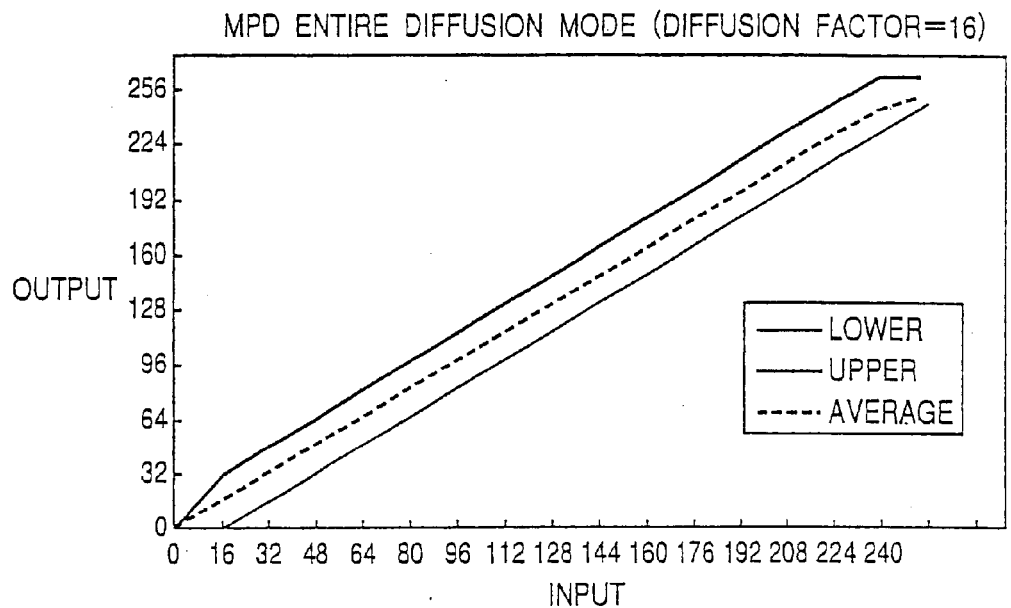
Fig.28
MPD DIFFUSION PATTERN
ONE FIELD 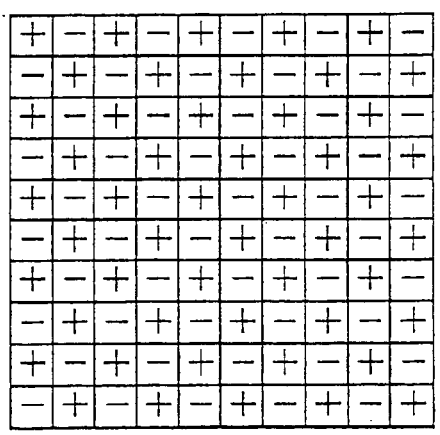 NEXT FIELD 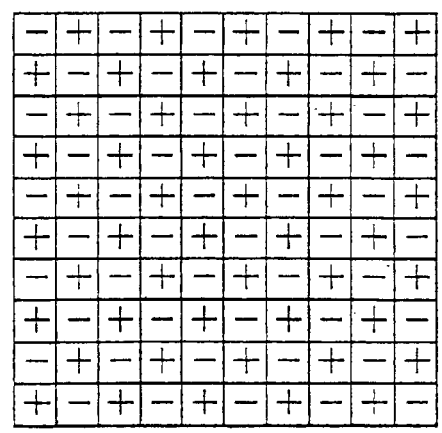

DETECTOR FOR DETECTING PSEUDO-CONTOUR NOISE AND DISPLAY APPARATUS USING THE DETECTOR

CROSS REFERENCE TO RELATED APPLICATION

This is a divisional of U.S. application Ser. No. 09/355,340, filed Aug. 5, 1999, which is the National Stage of International Application No. PCT/JP98/05511, filed Dec. 7, 1998, the contents of which are expressly incorporated by reference herein in their entireties. The International Application was published under PCT 21 (2) in English.

BACKGROUND OF THE INVENTION

1. Field of the Invention

The present invention is related to a display apparatus such as a plasma display panel (PDP) and digital micromirror device (DMD), and more specifically, to a display apparatus achieving gradation display by using a plurality of subfield images.

2. Related Art

A display apparatus of a PDP and a DMD makes use of a subfield method, which has binary memory, and which displays a dynamic image possessing half tones by temporally superimposing a plurality of binary images that have each been weighted. The following explanation deals with PDP, but applies equally to DMD as well.

A PDP subfield method is explained using FIGS. 1, 2 and 3.

Now, consider a PDP with pixels lined up 10 across and 4 vertically, as shown in FIG. 3. Let the respective R, GB of each pixel be 8 bits, assume that the brightness thereof is rendered, and that a brightness rendering of 256 gradations (256 gray scales) is possible. The following explanation, unless otherwise stated, deals with a G signal, but the explanation applies equally to R, B as well.

The portion indicated by A in FIG. 3 has a signal level of brightness of 128. If this is displayed in binary, a (1000 0000) signal level is added to each pixel in the portion indicated by A. Similarly, the portion indicated by B has a brightness of 127, and a (0111 1111) signal level is added to each pixel. The portion indicated by C has a brightness of 126, and a (0111 1110) signal level is added to each pixel. The portion indicated by D has a brightness of 125, and a (0111 1101) signal level is added to each pixel. The portion indicated by E has a brightness of 0, and a (0000 0000) signal level is added to each pixel. Lining up an 8-bit signal for each pixel perpendicularly in the location of each pixel, and horizontally slicing it bit-by-bit produces a subfield. That is, in an image display method, which utilizes the so-called subfield method, by which one field is divided into a plurality of differently weighted binary images, and displayed by temporally superimposing these binary images, a subfield is one of the divided binary images.

Since each pixel is displayed using 8 bits, as shown in FIG. 2, 8 subfields can be achieved. Collect the least significant bit of the 8-bit signal of each pixel, line them up in a 10×4 matrix, and let that be subfield SF1 (FIG. 2). Collect the second bit from the least significant bit, line them up similarly into a matrix, and let this be subfield SF2. Doing this creates subfields SF1, SF2, SF3, SF4, SF5, SF6, SF7, SF8. Needless to say, subfield SF8 is formed by collecting and lining up the most significant bits.

FIG. 4 shows the standard form of a 1 field PDP driving signal. As shown in FIG. 4, there are 8 subfields SF1, SF2, SF3, SF4, SF5, SF6, SF7, SF8 in the standard form of a PDP driving signal, and subfields SF1 through SF8 are processed in order, and all processing is performed within 1 field time. The processing of each subfield is explained using FIG. 4. The processing of each subfield constitutes setup period P1, write period P2 and sustain period P3. At setup period P1, a single pulse is applied to a sustaining electrode, and a single pulse is also applied to each scanning electrode (There are only up to 4 scanning electrodes indicated in FIG. 4 because there are only 4 scanning lines shown in the example in FIG. 3, but in reality, there are a plurality of scanning electrodes, 480, for example.). In accordance with this, preliminary discharge is performed.

At write period P2, a horizontal-direction scanning electrodes scans sequentially, and a predetermined write is performed only to a pixel that received a pulse from a data electrode. For example, when processing subfield SF1, a write is performed for a pixel represented by "1" in subfield SF1 depicted in FIG. 2, and a write is not performed for a pixel represented by "0."

At sustain period P3, a sustaining pulse (driving pulse) is outputted in accordance with the weighted value of each subfield. For a written pixel represented by "1," a plasma discharge is performed for each sustaining pulse, and the brightness of a predetermined pixel is achieved with one plasma discharge. In subfield SF1, since weighting is "1," a brightness level of "1" is achieved. In subfield SF2, since weighting is "2," a brightness level of "2" is achieved. That is, write period P2 is the time when a pixel which is to emit light is selected, and sustain period P3 is the time when light is emitted a number of times that accords with the weighting quantity.

As shown in FIG. 4, subfields SF1, SF2, SF3, SF4, SF5, SF6, SF7, SF8 are weighted at 1, 2, 4, 8, 16, 32, 64, 128, respectively. Therefore, the brightness level of each pixel can be adjusted using 256 gradations, from 0 to 255.

In the B region of FIG. 3, light is emitted in subfields SF1, SF2, SF3, SF4, SF5, SF6, SF7, but light is not emitted in subfield SF8. Therefore, a brightness level of "127" (=1+2+4+8+16+32+64) is achieved.

And in the A region of FIG. 3, light is not emitted in subfields SF1, SF2, SF3, SF4, SF5, SF6, SF7, but light is emitted in subfield SF8. Therefore, a brightness level of "128" is achieved.

A display apparatus as described above which displays image with gradations by using a plurality of subfields has a problem that pseudo-contour noise appears while displaying a motion picture. Pseudo-contour noise is noise that occurs from the human visual characteristics. It appears due to the human visual characteristics and a characteristics of subfield display in a display apparatus which displays image with gradations by using the subfield method. That is, it is a phenomenon, whereby, when a person moves his eyes, a subfield that differs from an original gradation is projected on a retina, and therefore the original gradation is misperceived. Pseudo-contour noise is explained below.

Assume that regions A, B, C, D from the state shown in FIG. 3 have been moved one pixel width to the right as shown in FIG. 5. Thereupon, the viewpoint of the eye of a person looking at the screen also moves to the right so as to follow regions A, B, C, D. Thereupon, three vertical pixels in region B (the B1 portion of FIG. 3) will replace three vertical pixels in region A (A1 portion of FIG. 5) after one field. Then, at the point in time when the displayed image changes from FIG. 3 to FIG. 5, the eye of a human being is cognizant of region B1, which takes the form of a logical product (AND) of B1 region data (0111 1111) and A1 region data (1000 0000), that is (0000 0000). That is, the B1 region is not displayed at the original 127 level of brightness, but rather, is displayed at a brightness level of 0. Thereupon, an apparent dark borderline appears in region B1. If an apparent change from "1" to "0" is applied to an upper bit like this, an apparent dark borderline appears.

Conversely, when an image changes from FIG. 5 to FIG. 3, at the point in time when it changes to FIG. 3, a viewer is cognizant of region A1, which takes the form of a logical add (OR) of A1 region data (1000 0000) and B1 region data (0111 1111), that is (1111 1111). That is, the most significant bit is forcibly changed from "0" to "1," and in accordance with this, the A1 region is not displayed at the original 128 level of brightness, but rather, is displayed at a roughly 2-fold brightness level of 255. Thereupon, an apparent bright borderline appears in region A1. If an apparent change from "0" to "1" is applied to an upper bit like this, an apparent bright borderline appears.

In the case of a dynamic image only, a borderline such as this that appears on a screen is called pseudo-contour noise ("pseudo-contour noise seen in a pulse width modulated motion picture display": Television Society Technical Report, Vol. 19, No. 2, IDY95-21, pp. 61–66), causing degradation of image quality.

As technology for reducing this pseudo-contour noise, there is a display apparatus disclosed in Japanese Patent Laid-Open Publication No. 09-258689 or 10-39830. The display apparatus of No. 09-258689 attempts to reduce pseudo-contour noise by selecting a different modulating signal every n pixels, and performing different modulation every n pixels using the selected modulation signal. However this apparatus performs pseudo-contour noise reduction processing for an entire image, therefore it has a problem that displayed image quality over the entire image is degraded since reduction processing is performed for an area in which a pseudo-contour noise does not originally appear.

Further, the display apparatus of No. 10-39830 detects a dynamic area (motion picture area) of an image, and reduces pseudo-contour noise by performing modulation processing on every pixel in this area. However, this apparatus performs pseudo-contour noise reduction processing for an entire dynamic area, and therefore it performs pseudo-contour noise reduction processing even for an area where pseudo-contour noise dose not appear. Consequently quality of displayed image is degraded when an entire image is viewed.

SUMMARY OF THE INVENTION

The present invention has as an object to provide a detector, which solves for the above-described problems, for detecting pseudo-contour noise that spuriously appears in a dynamic area of an image in a display apparatus which displays gradations by using a plurality of subfield images.

The present invention also has as an object to (provide a display apparatus suitable for a plasma display panel etc, for reducing appearance of pseudo-contour noise by making use of the pseudo-contour noise detector.

In a first aspect of the invention, a detector is provided for detecting appearance of pseudo-contour noise. The pseudo-contour noise appears spuriously when displaying a motion picture in a manner that gradation display is performed by using a plurality of subfields into which one field of input image is divided. The detector comprises a noise calculating unit to compare a value of one pixel with values of pixels peripheral to the one pixel in each subfield for each pixel of an input image, and to calculate a noise quantity based on said comparison result. The noise quantity indicates the probability of pseudo-contour noise appearance in the input image displayed.

The noise calculating unit may comprise a pixel comparing unit and a noise determining unit. The pixel comparing unit may compare a value of one pixel with values of pixels peripheral to the one pixel in each subfield for each pixel of an input image, and detect the difference of pixel value among those pixels in each subfield for each pixel from the result of the comparison. The noise determining unit may determine the noise quantity based on the difference of pixel value from the pixel comparing unit.

Further, the detector may comprise an exclusion area detecting unit and a excluding unit. The exclusion area detecting unit may detect an area in which the pseudo-contour noise is not expected to occur in the input image. The excluding unit may exclude the area detected by the exclusion area detection unit from area in which the noise quantity is calculated by the noise calculating unit.

The advantage of the detector according to the invention is that it is possible to specify both the magnitude of the probability of pseudo-contour noise appearance and the area in an image in which pseudo-contour noise is likely to be generated.

In a second aspect of the invention, A display apparatus is provided for displaying an input image with gradations by using a plurality of subfields into which one field of said input image is divided. The display apparatus comprises the detector to detect appearance of pseudo-contour noise and a pseudo-contour noise reducing unit. The pseudo-contour noise reducing unit reduces the pseudo-contour noise for an area in which there is a probability of the pseudo-contour noise appearing based on the results by the detector.

The pseudo-contour noise reducing unit may control gradation of the displayed image to reduce appearance of said pseudo-contour noise.

Further, the pseudo-contour noise reducing unit may reduce the pseudo-contour noise by performing a predetermined modulation to an image area in which the appearance of pseudo-contour noise is expected by the detector.

The advantage of the display apparatus according to the invention is that the appearance of pseudo-contour noise can be reduced and the degradation of picture quality can be prevented when displaying image with the subfield method.

BRIEF DESCRIPTION OF THE DRAWINGS

A better understanding of the invention will be obtained by reading the description of the invention below, with reference to the following drawings.

FIGS. 1A–1H illustrate a diagram of subfields SF1–SF8.

FIGS. 8A and 8B show waveform diagrams of a standard form of PDP driving signal.

FIGS. 10A and 10B show waveform diagrams of PDP driving signal when vertical synchronizing frequency is 60 Hz or 72 Hz, respectively.

FIG. 27 shows a Diagram for explaining the principle of MPD diffusion processing.

FIG. 28 shows diagrams showing MPD diffusion patterns for MPD diffusion processing.

DETAILED DESCRIPTION OF THE PREFERRED EMBODIMENTS

Preferred embodiments of a display apparatus related to the present invention are described below with reference to the accompanying drawings.

(Various PDP Driving Signals)

Figure 2:
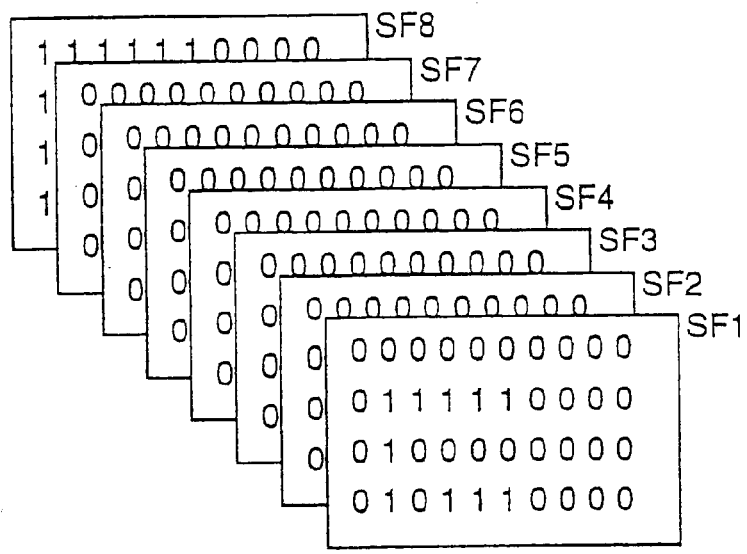
FIG. 2 illustrates a diagram in which subfields SF1–SF8 overlay one another.
Figure 3:
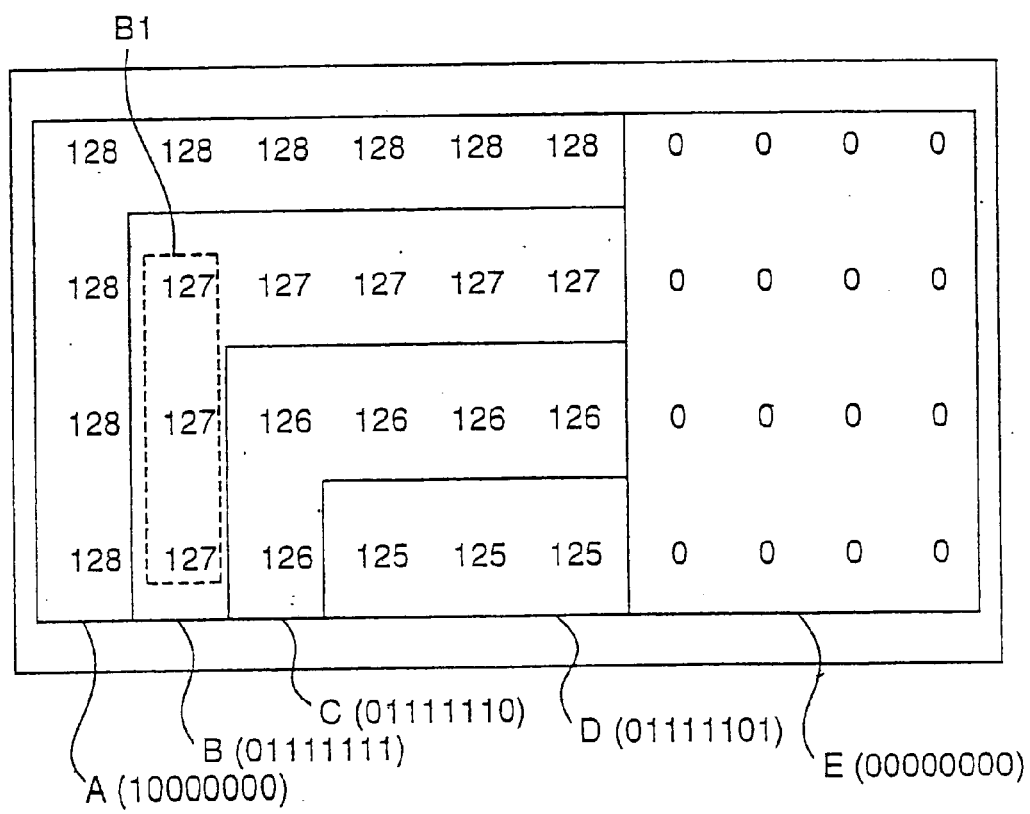
FIG. 3 shows a diagram of an example of PDP screen brightness distribution.
Figure 4:
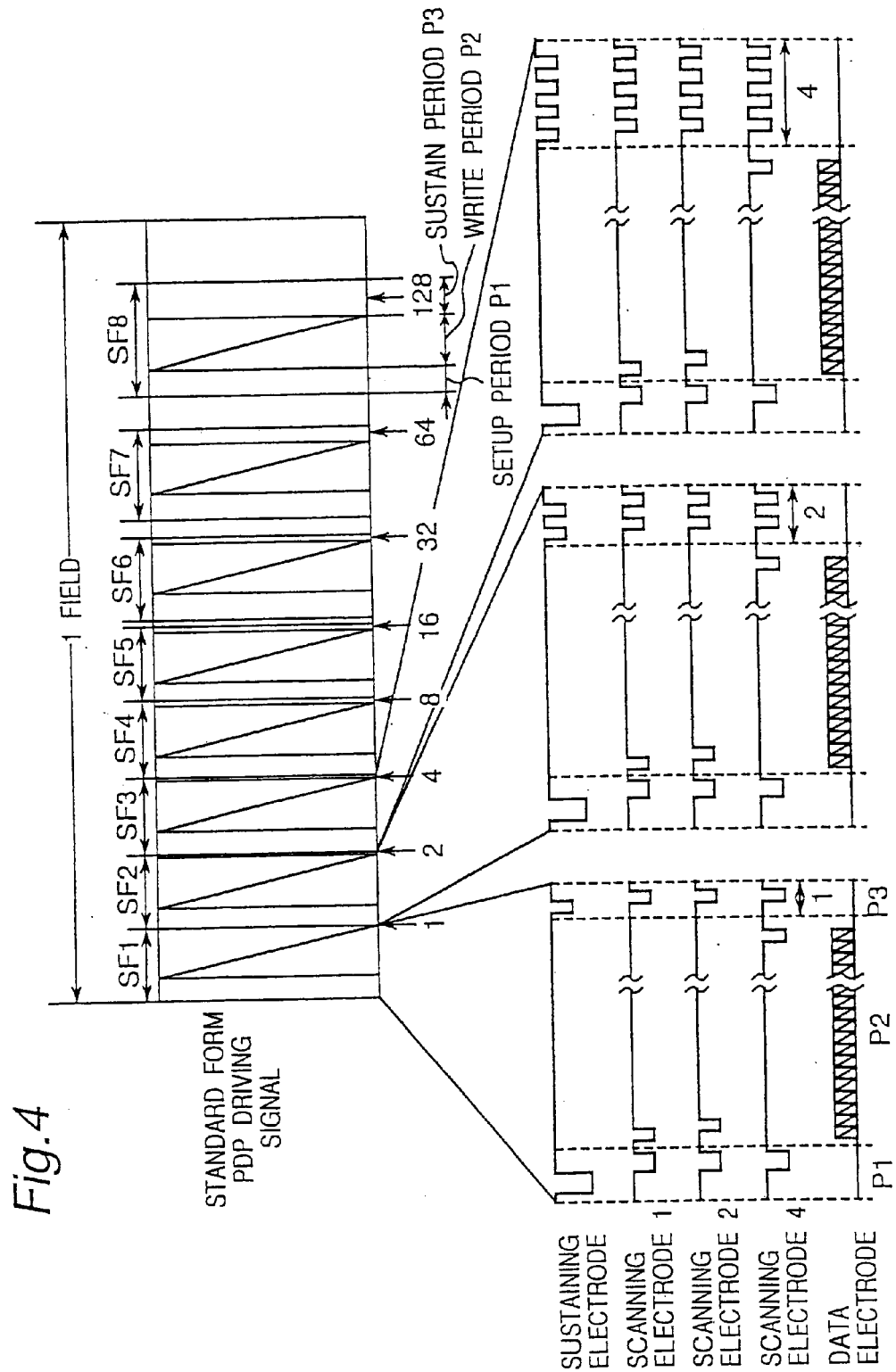
FIG. 4 shows a waveform diagram showing the standard form of a PDP driving signal.
Figure 5:
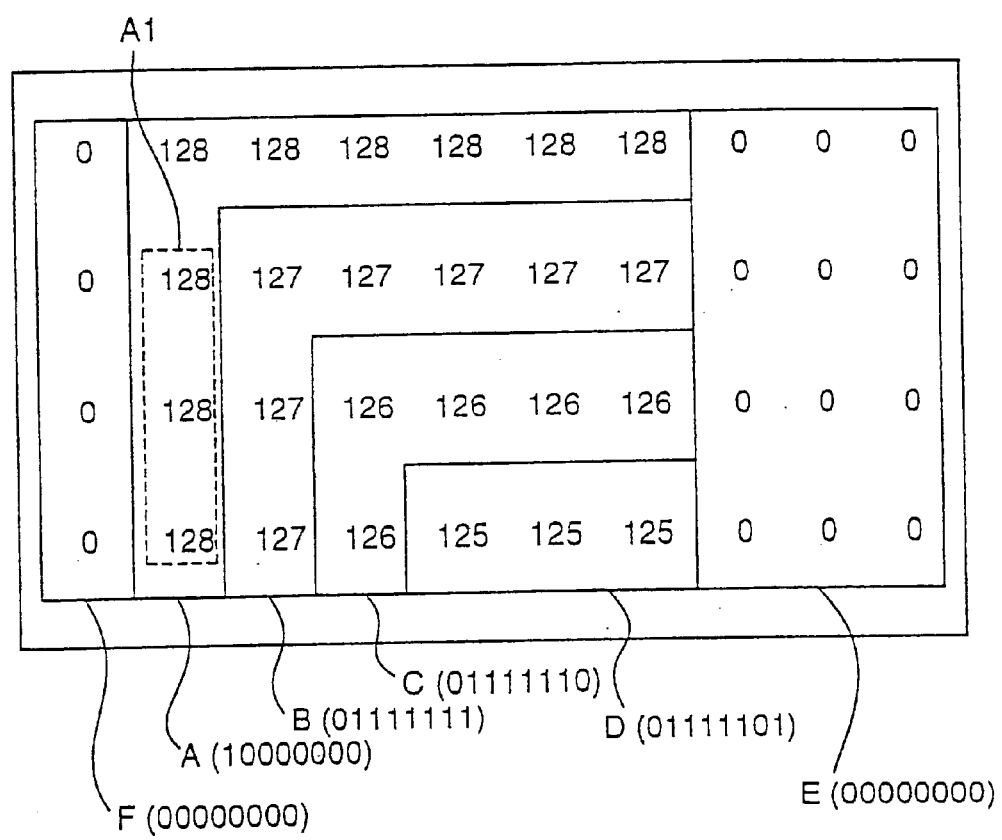
FIG. 5 shows a diagram similar to FIG. 3, but particularly showing a case in which one pixel moved from the PDP screen brightness distribution of FIG. 3.

Prior to describing the preferred embodiments of a display apparatus related to the present invention, first, variations of the standard form of PDP driving signal shown in FIG. 4 are described.

Figure 6:
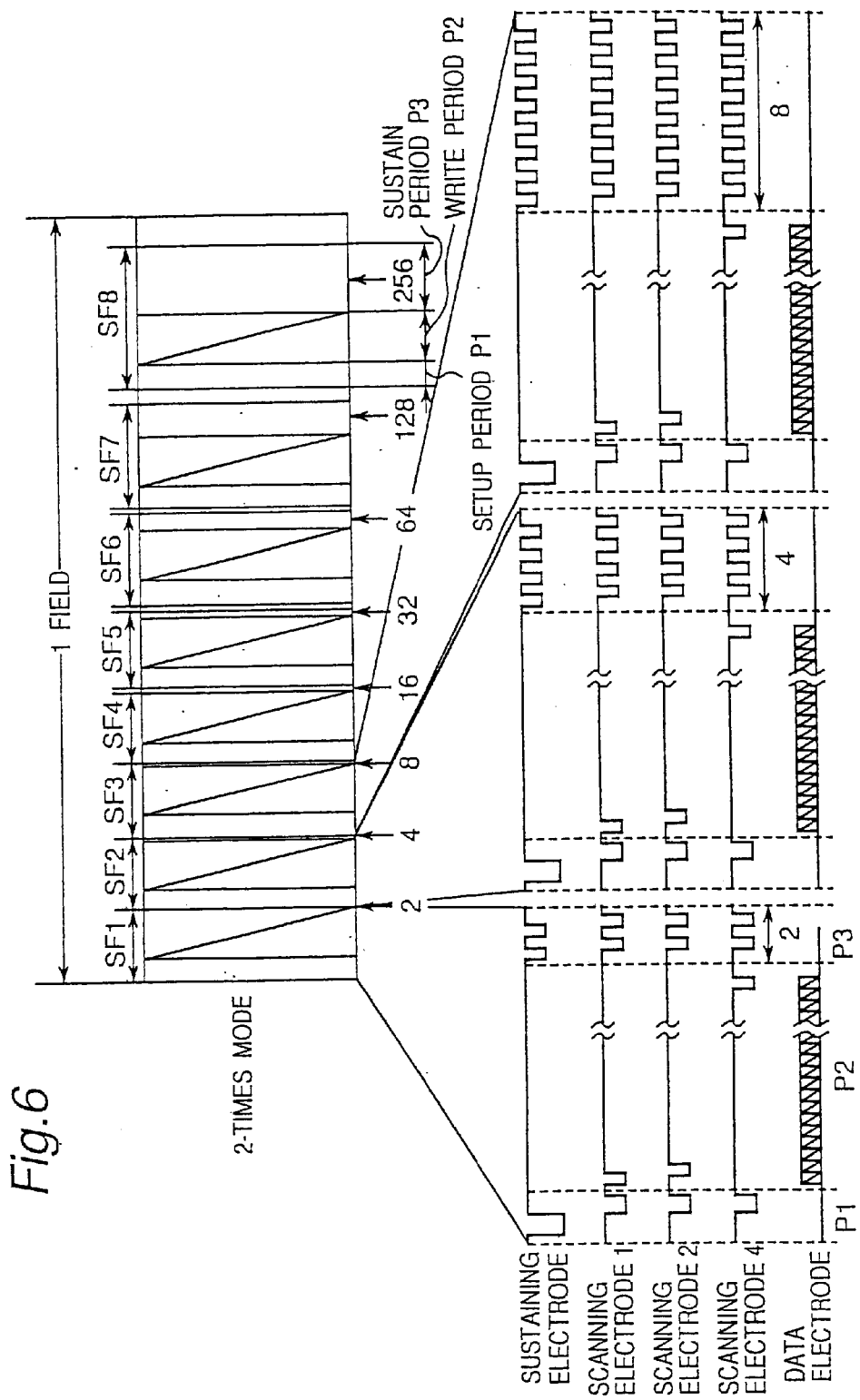
FIG. 6 shows a waveform diagram showing a 2-times mode of a PDP driving signal.

FIG. 6 shows a 2-times mode PDP driving signal. Furthermore, the PDP driving signal shown in FIG. 4 is a 1-times mode. With the 1-times mode in FIG. 4, the number of sustaining pulses contained in the sustain periods P3 for subfields SF1 through SF8, that is, the weighting values, were 1, 2, 4, 8, 16, 32, 64, 128, respectively, but with the 2-times mode of FIG. 6, the number of sustaining pulses contained in the sustain periods P3 for subfields SF1 through SF8 are 2, 4, 8, 16, 32, 64, 128, 256, respectively, doubling for all subfields. In accordance with this, compared to a standard form PDP driving signal, which is a 1-times mode, a 2-times mode PDP driving signal can produce an image display with 2 times the brightness.

Figure 7:
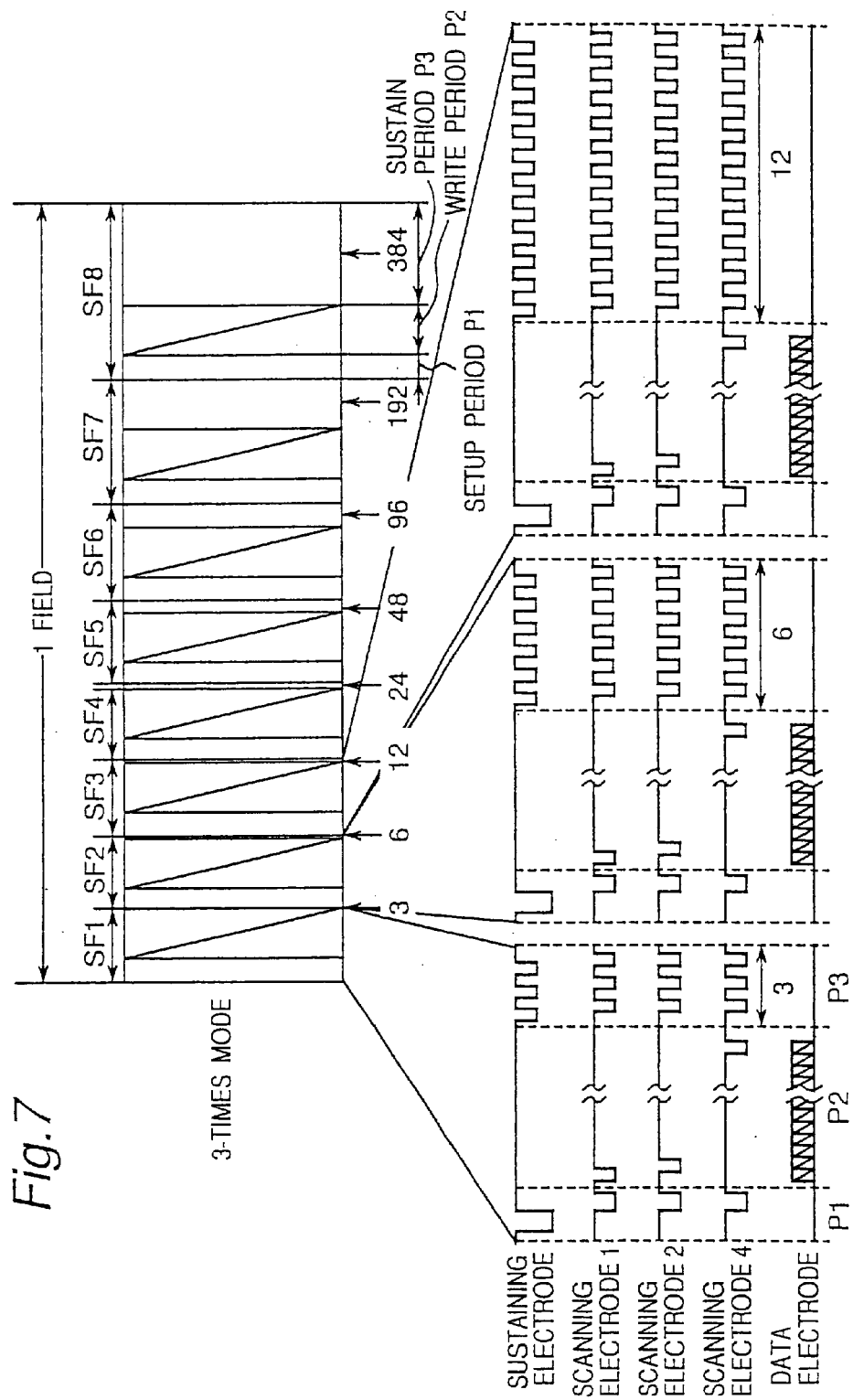
FIG. 7 shows a waveform diagram showing a 3-times mode of a PDP driving signal.

FIG. 7 shows a 3-times mode PDP driving signal. Therefore, the number of sustaining pulses contained in the sustain periods P3 for subfields SF1 through SF8 are 3, 6, 12, 24, 48, 96, 192, 384, respectively, tripling for all subfields.

In this way, although dependent on the degree of margin in 1 field, the total number of gradations is 256 gradations, and it is possible to create a maximum 6-times mode PDP driving signal. In accordance with this, it is possible to produce an image display with 6 times the brightness.

FIG. 8A shows a standard form PDP driving signal, and FIG. 8B shows a PDP driving signal, which has been varied so that one subfield is added, and it has subfields SF1 through SF9. For the standard form, the final subfield SF8 is weighted by 128 sustaining pulses, and for the variation of FIG. 8B, each of the last two subfields SF8, SF9 are weighted by 64 sustaining pulses. For example, when a brightness level of 130 is to be displayed, with the standard form of FIG. 8A, this can be achieved using both subfield SF2 (weighted 2) and subfield SF8 (weighted 128), whereas with the variation of FIG. 8B, this brightness level can be achieved using three subfields of subfield SF2 (weighted 2), subfield SF8 (weighted 64) and subfield SF9 (weighted 64). By increasing the number of subfields in this way, it is possible to decrease the weight of the subfield with heavy weight. Decreasing weight in this manner enables a proportional reduction in pseudo-contour noise.

Table 1, Table 2, Table 3, Table 4, Table 5, Table 6 shown below are a 1-times mode weighting table, a 2-times mode weighting table, a 3-times mode weighting table, a 4-times mode weighting table, a 5-times mode weighting table, and a 6-times mode weighting table, respectively, for when the subfield number is changed in from 8 to 14.

TABLE 1

1-Times Mode Weighting Table

| Number of Subfields | \multicolumn{15}{c}{Number of Pulses (Weight) in Each Subfield} |
|---|---|---|---|---|---|---|---|---|---|---|---|---|---|---|---|

| Number of Subfields | SF1 | SF2 | SF3 | SF4 | SF5 | SF6 | SF7 | SF8 | SF9 | SF10 | SF11 | SF12 | SF13 | SF14 | Total |
|---|---|---|---|---|---|---|---|---|---|---|---|---|---|---|---|
| 8 | 1 | 2 | 4 | 8 | 16 | 32 | 64 | 128 | — | — | — | — | — | — | 255 |
| 9 | 1 | 2 | 4 | 8 | 16 | 32 | 64 | 64 | 64 | — | — | — | — | — | 255 |
| 10 | 1 | 2 | 4 | 8 | 16 | 32 | 48 | 48 | 48 | 48 | — | — | — | — | 255 |
| 11 | 1 | 2 | 4 | 8 | 16 | 32 | 39 | 39 | 39 | 39 | 36 | — | — | — | 255 |
| 12 | 1 | 2 | 4 | 8 | 16 | 32 | 32 | 32 | 32 | 32 | 32 | 32 | — | — | 255 |
| 13 | 1 | 2 | 4 | 8 | 16 | 28 | 28 | 28 | 28 | 28 | 28 | 28 | 28 | — | 255 |
| 14 | 1 | 2 | 4 | 8 | 16 | 25 | 25 | 25 | 25 | 25 | 25 | 25 | 25 | 24 | 255 |

TABLE 2

2-Times Mode Weighting Table

| Number of Subfields | SF1 | SF2 | SF3 | SF4 | SF5 | SF6 | SF7 | SF8 | SF9 | SF10 | SF11 | SF12 | SF13 | SF14 | Total |
|---|---|---|---|---|---|---|---|---|---|---|---|---|---|---|---|
| 8 | 2 | 4 | 8 | 16 | 32 | 64 | 128 | 256 | — | — | — | — | — | — | 510 |
| 9 | 2 | 4 | 8 | 16 | 32 | 64 | 128 | 128 | 128 | — | — | — | — | — | 510 |
| 10 | 2 | 4 | 8 | 16 | 32 | 64 | 96 | 96 | 96 | 96 | — | — | — | — | 510 |
| 11 | 2 | 4 | 8 | 16 | 32 | 64 | 78 | 78 | 78 | 78 | 72 | — | — | — | 510 |
| 12 | 2 | 4 | 8 | 16 | 32 | 64 | 64 | 64 | 64 | 64 | 64 | 64 | — | — | 510 |
| 13 | 2 | 4 | 8 | 16 | 32 | 56 | 56 | 56 | 56 | 56 | 56 | 56 | 56 | — | 510 |
| 14 | 2 | 4 | 8 | 16 | 32 | 50 | 50 | 50 | 50 | 50 | 50 | 50 | 50 | 48 | 510 |

TABLE 3

3-Times Mode Weighting Table

| Number of Subfields | SF1 | SF2 | SF3 | SF4 | SF5 | SF6 | SF7 | SF8 | SF9 | SF10 | SF11 | SF12 | SF13 | SF14 | Total |
|---|---|---|---|---|---|---|---|---|---|---|---|---|---|---|---|
| 8 | 3 | 6 | 12 | 24 | 48 | 96 | 192 | 384 | — | — | — | — | — | — | 765 |
| 9 | 3 | 6 | 12 | 24 | 48 | 96 | 192 | 192 | 192 | — | — | — | — | — | 765 |
| 10 | 3 | 6 | 12 | 24 | 48 | 96 | 144 | 144 | 144 | 144 | — | — | — | — | 765 |
| 11 | 3 | 6 | 12 | 24 | 48 | 96 | 117 | 117 | 117 | 117 | 108 | — | — | — | 765 |
| 12 | 3 | 6 | 12 | 24 | 48 | 96 | 96 | 96 | 96 | 96 | 96 | 96 | — | — | 765 |
| 13 | 3 | 6 | 12 | 24 | 48 | 84 | 84 | 84 | 84 | 84 | 84 | 84 | 84 | — | 765 |
| 14 | 3 | 6 | 12 | 24 | 48 | 75 | 75 | 75 | 75 | 75 | 75 | 75 | 75 | 72 | 765 |

TABLE 4

4-Times Mode Weighting Table

| Number of Subfields | SF1 | SF2 | SF3 | SF4 | SF5 | SF6 | SF7 | SF8 | SF9 | SF10 | SF11 | SF12 | SF13 | SF14 | Total |
|---|---|---|---|---|---|---|---|---|---|---|---|---|---|---|---|
| 8 | 4 | 8 | 16 | 32 | 64 | 128 | 256 | 512 | — | — | — | — | — | — | 1020 |
| 9 | 4 | 8 | 16 | 32 | 64 | 128 | 256 | 256 | 256 | — | — | — | — | — | 1020 |
| 10 | 4 | 8 | 16 | 32 | 64 | 128 | 192 | 192 | 192 | 192 | — | — | — | — | 1020 |
| 11 | 4 | 8 | 16 | 32 | 64 | 128 | 156 | 156 | 156 | 156 | 144 | — | — | — | 1020 |
| 12 | 4 | 8 | 16 | 32 | 64 | 128 | 128 | 128 | 128 | 128 | 128 | 128 | — | — | 1020 |
| 13 | 4 | 8 | 16 | 32 | 64 | 112 | 112 | 112 | 112 | 112 | 112 | 112 | 112 | — | 1020 |
| 14 | 4 | 8 | 16 | 32 | 64 | 100 | 100 | 100 | 100 | 100 | 100 | 100 | 100 | 96 | 1020 |

TABLE 5

5-Times Mode Weighting Table

| Number of Subfields | Number of Pulses (Weight) in Each Subfield | | | | | | | | | | | | | | Total |
|---|---|---|---|---|---|---|---|---|---|---|---|---|---|---|---|
| | SF1 | SF2 | SF3 | SF4 | SF5 | SF6 | SF7 | SF8 | SF9 | SF10 | SF11 | SF12 | SF13 | SF14 | |
| 8 | 5 | 10 | 20 | 40 | 80 | 160 | 320 | 640 | — | — | — | — | — | — | 1275 |
| 9 | 5 | 10 | 20 | 40 | 80 | 160 | 320 | 320 | 320 | — | — | — | — | — | 1275 |
| 10 | 5 | 10 | 20 | 40 | 80 | 160 | 240 | 240 | 240 | 240 | — | — | — | — | 1275 |
| 11 | 5 | 10 | 20 | 40 | 80 | 160 | 195 | 195 | 195 | 195 | 180 | — | — | — | 1275 |
| 12 | 5 | 10 | 20 | 40 | 80 | 160 | 160 | 160 | 160 | 160 | 160 | 160 | — | — | 1275 |
| 13 | 5 | 10 | 20 | 40 | 80 | 140 | 140 | 140 | 140 | 140 | 140 | 140 | 140 | — | 1275 |
| 14 | 5 | 10 | 20 | 40 | 80 | 125 | 125 | 125 | 125 | 125 | 125 | 125 | 125 | 120 | 1275 |

TABLE 6

6-Times Mode Weighting Table

| Number of Subfields | Number of Pulses (Weight) in Each Subfield | | | | | | | | | | | | | | Total |
|---|---|---|---|---|---|---|---|---|---|---|---|---|---|---|---|
| | SF1 | SF2 | SF3 | SF4 | SF5 | SF6 | SF7 | SF8 | SF9 | SF10 | SF11 | SF12 | SF13 | SF14 | |
| 8 | 6 | 12 | 24 | 48 | 96 | 192 | 384 | 768 | — | — | — | — | — | — | 1530 |
| 9 | 6 | 12 | 24 | 48 | 96 | 192 | 384 | 384 | 384 | — | — | — | — | — | 1530 |
| 10 | 6 | 12 | 24 | 48 | 96 | 192 | 288 | 288 | 288 | 288 | — | — | — | — | 1530 |
| 11 | 6 | 12 | 24 | 48 | 96 | 192 | 234 | 234 | 234 | 234 | 216 | — | — | — | 1530 |
| 12 | 6 | 12 | 24 | 48 | 96 | 192 | 192 | 192 | 192 | 192 | 192 | 192 | — | — | 1530 |
| 13 | 6 | 12 | 24 | 48 | 96 | 168 | 168 | 168 | 168 | 168 | 168 | 168 | 168 | — | 1530 |
| 14 | 6 | 12 | 24 | 48 | 96 | 150 | 150 | 150 | 150 | 150 | 150 | 150 | 150 | 144 | 1530 |

The way to read these tables is as follows. For example, in Table 1, it is a 1-times mode, and when viewing the row, in which the subfield number is 12, the table indicates that the weighting of subfields SF1 through SF12, respectively, are 1, 2, 4, 8, 16, 32, 32, 32, 32, 32, 32, 32. In accordance with-this, the maximum weight is kept at 32. Further, in Table 3, it is a 3-times mode, and the row in which the subfield number is 12 constitutes weighting that is 3 times the above-mentioned values, that is, 3, 6, 12, 24, 48, 96, 96, 96, 96, 96, 96, 96.

Table 7, Table 8, Table 9, Table 10, Table 11, Table 12, Table 13 shown below indicate which subfield should perform a plasma discharge light emission in each gradation, when the total number of gradations is 256, when the respective subfield numbers are 8, 9, 10, 11, 12, 13, 14.

TABLE 7

Eight Subfields

○: Active Subfield

| Subfield No. Gradation\Number of Pulses | SF1 | SF2 | SF3 | SF4 | SF5 | SF6 | SF7 | SF8 |
|---|---|---|---|---|---|---|---|---|
| | 1 | 2 | 4 | 8 | 16 | 32 | 64 | 128 |
| 0 | | | | | | | | |
| 1 | ○ | | | | | | | |
| 2 | | ○ | | | | | | |
| 3 | ○ | ○ | | | | | | |
| 4 | | | ○ | | | | | |
| 5 | ○ | | ○ | | | | | |
| 6 | | ○ | ○ | | | | | |
| 7 | ○ | ○ | ○ | | | | | |
| 8–15 | Ditto to 0–7 | | | ○ | | | | |
| 16–31 | Ditto to 0–15 | | | | ○ | | | |
| 32–63 | Ditto to 0–31 | | | | | ○ | | |

TABLE 7-continued

Eight Subfields

○: Active Subfield

| Subfield No. Gradation\Number of Pulses | SF1 | SF2 | SF3 | SF4 | SF5 | SF6 | SF7 | SF8 |
|---|---|---|---|---|---|---|---|---|
| | 1 | 2 | 4 | 8 | 16 | 32 | 64 | 128 |
| 64–127 | Ditto to 0–63 | | | | | | ○ | |
| 128–255 | Ditto to 0–127 | | | | | | | ○ |

TABLE 8

Nine Subfields

○: Active Subfield

| Subfield No. Gradation\Number of Pulses | SF1 | SF2 | SF3 | SF4 | SF5 | SF6 | SF7 | SF8 | SF9 |
|---|---|---|---|---|---|---|---|---|---|
| | 1 | 2 | 4 | 8 | 16 | 32 | 64 | 64 | 64 |
| 0 | | | | | | | | | |
| 1 | ○ | | | | | | | | |
| 2 | | ○ | | | | | | | |
| 3 | ○ | ○ | | | | | | | |
| 4 | | | ○ | | | | | | |
| 5 | ○ | | ○ | | | | | | |
| 6 | | ○ | ○ | | | | | | |
| 7 | ○ | ○ | ○ | | | | | | |
| 8–15 | Ditto to 0–7 | | | ○ | | | | | |
| 16–31 | Ditto to 0–15 | | | | ○ | | | | |
| 32–63 | Ditto to 0–31 | | | | | ○ | | | |
| 64–127 | Ditto to 0–63 | | | | | | ○ | | |
| 128–191 | Ditto to 0–63 | | | | | | | ○ | |
| 192–255 | Ditto to 0–63 | | | | | | | ○ | ○ |

TABLE 9

Ten Subfields

○: Active Subfield

| Subfield No. | SF 1 | SF 2 | SF 3 | SF 4 | SF 5 | SF 6 | SF 7 | SF 8 | SF 9 | SF 10 |
|---|---|---|---|---|---|---|---|---|---|---|
| Gradation\Number of Pulses | 1 | 2 | 4 | 8 | 16 | 32 | 48 | 48 | 48 | 48 |
| 0 | | | | | | | | | | |
| 1 | ○ | | | | | | | | | |
| 2 | | ○ | | | | | | | | |
| 3 | ○ | ○ | | | | | | | | |
| 4 | | | ○ | | | | | | | |
| 5 | ○ | | ○ | | | | | | | |
| 6 | | ○ | ○ | | | | | | | |
| 7 | ○ | ○ | ○ | | | | | | | |
| 8–15 | Ditto to 0–7 | | | ○ | | | | | | |
| 16–31 | Ditto to 0–15 | | | | ○ | | | | | |
| 32–63 | Ditto to 0–31 | | | | | ○ | | | | |
| 64–111 | Ditto to 16–63 | | | | | | ○ | | | |
| 112–159 | Ditto to 16–63 | | | | | | ○ | ○ | | |
| 160–207 | Ditto to 16–63 | | | | | | ○ | ○ | ○ | |
| 208–255 | Ditto to 16–63 | | | | | | ○ | ○ | ○ | ○ |

TABLE 10

Eleven Subfields

○: Active Subfield

| Subfield No. | SF 1 | SF 2 | SF 3 | SF 4 | SF 5 | SF 6 | SF 7 | SF 8 | SF 9 | SF 10 | SF 11 |
|---|---|---|---|---|---|---|---|---|---|---|---|
| Gradation\Number of Pulses | 1 | 2 | 4 | 8 | 16 | 32 | 39 | 39 | 39 | 39 | 36 |
| 0 | | | | | | | | | | | |
| 1 | ○ | | | | | | | | | | |
| 2 | | ○ | | | | | | | | | |
| 3 | ○ | ○ | | | | | | | | | |
| 4 | | | ○ | | | | | | | | |
| 5 | ○ | | ○ | | | | | | | | |
| 6 | | ○ | ○ | | | | | | | | |
| 7 | ○ | ○ | ○ | | | | | | | | |
| 8–15 | Ditto to 0–7 | | | ○ | | | | | | | |
| 16–31 | Ditto to 0–15 | | | | ○ | | | | | | |
| 32–63 | Ditto to 0–31 | | | | | ○ | | | | | |
| 64–102 | Ditto to 25–63 | | | | | | ○ | | | | |
| 103–141 | Ditto to 25–63 | | | | | | ○ | ○ | | | |
| 142–180 | Ditto to 25–63 | | | | | | ○ | ○ | ○ | | |
| 181–244 | Ditto to 25–63 | | | | | | ○ | ○ | ○ | ○ | |
| 245–255 | Ditto to 53–63 | | | | | | ○ | ○ | ○ | ○ | ○ |

TABLE 11

Twelve Subfields

○: Active Subfield

| Subfield No. | SF 1 | SF 2 | SF 3 | SF 4 | SF 5 | SF 6 | SF 7 | SF 8 | SF 9 | SF 10 | SF 11 | SF 12 |
|---|---|---|---|---|---|---|---|---|---|---|---|---|
| Gradation\Number of Pulses | 1 | 2 | 4 | 8 | 16 | 32 | 32 | 32 | 32 | 32 | 32 | 32 |
| 0 | | | | | | | | | | | | |
| 1 | ○ | | | | | | | | | | | |
| 2 | | ○ | | | | | | | | | | |
| 3 | ○ | ○ | | | | | | | | | | |
| 4 | | | ○ | | | | | | | | | |
| 5 | ○ | | ○ | | | | | | | | | |
| 6 | | ○ | ○ | | | | | | | | | |
| 7 | ○ | ○ | ○ | | | | | | | | | |
| 8–15 | Ditto to 0–7 | | | ○ | | | | | | | | |
| 16–31 | Ditto to 0–15 | | | | ○ | | | | | | | |
| 32–63 | Ditto to 0–31 | | | | | ○ | | | | | | |
| 64–95 | Ditto to 0–31 | | | | | | ○ | | | | | |
| 96–127 | Ditto to 0–31 | | | | | | ○ | ○ | | | | |
| 128–159 | Ditto to 0–31 | | | | | | ○ | ○ | ○ | | | |
| 160–191 | Ditto to 0–31 | | | | | | ○ | ○ | ○ | ○ | | |
| 192–223 | Ditto to 0–31 | | | | | | ○ | ○ | ○ | ○ | ○ | |
| 224–255 | Ditto to 0–31 | | | | | | ○ | ○ | ○ | ○ | ○ | ○ |

TABLE 12

Thirteen Subfields

○: Active Subfield

| Subfield No. | SF 1 | SF 2 | SF 3 | SF 4 | SF 5 | SF 6 | SF 7 | SF 8 | SF 9 | SF 10 | SF 11 | SF 12 | SF 13 |
|---|---|---|---|---|---|---|---|---|---|---|---|---|---|
| Gradation\Number of Pulses | 1 | 2 | 4 | 8 | 16 | 28 | 28 | 28 | 28 | 28 | 28 | 28 | 28 |
| 0 | | | | | | | | | | | | | |
| 1 | ○ | | | | | | | | | | | | |
| 2 | | ○ | | | | | | | | | | | |
| 3 | ○ | ○ | | | | | | | | | | | |
| 4 | | | ○ | | | | | | | | | | |
| 5 | ○ | | ○ | | | | | | | | | | |
| 6 | | ○ | ○ | | | | | | | | | | |
| 7 | ○ | ○ | ○ | | | | | | | | | | |
| 8–15 | Ditto to 0–7 | | | ○ | | | | | | | | | |
| 16–31 | Ditto to 0–15 | | | | ○ | | | | | | | | |
| 32–59 | Ditto to 4–31 | | | | | ○ | | | | | | | |
| 60–87 | Ditto to 4–31 | | | | | ○ | ○ | | | | | | |
| 88–115 | Ditto to 4–31 | | | | | ○ | ○ | ○ | | | | | |
| 116–143 | Ditto to 4–31 | | | | | ○ | ○ | ○ | ○ | | | | |
| 144–171 | Ditto to 4–31 | | | | | ○ | ○ | ○ | ○ | ○ | | | |
| 172–199 | Ditto to 4–31 | | | | | ○ | ○ | ○ | ○ | ○ | ○ | | |
| 200–227 | Ditto to 4–31 | | | | | ○ | ○ | ○ | ○ | ○ | ○ | ○ | |
| 228–255 | Ditto to 4–31 | | | | | ○ | ○ | ○ | ○ | ○ | ○ | ○ | ○ |

TABLE 13

Fourteen Subfields

O: Active Subfield

| Subfield No.<br>Gradation\Number of Pulses | SF1<br>1 | SF2<br>2 | SF3<br>4 | SF4<br>8 | SF5<br>16 | SF6<br>25 | SF7<br>25 | SF8<br>25 | SF9<br>25 | SF10<br>25 | SF11<br>25 | SF12<br>25 | SF13<br>25 | SF14<br>24 |
|---|---|---|---|---|---|---|---|---|---|---|---|---|---|---|
| 0 | | | | | | | | | | | | | | |
| 1 | O | | | | | | | | | | | | | |
| 2 | | O | | | | | | | | | | | | |
| 3 | O | O | | | | | | | | | | | | |
| 4 | | | O | | | | | | | | | | | |
| 5 | O | | O | | | | | | | | | | | |
| 6 | | O | O | | | | | | | | | | | |
| 7 | O | O | O | | | | | | | | | | | |
| 8–15 | Ditto to 0–7 | | | O | | | | | | | | | | |
| 16–31 | Ditto to 0–15 | | | | O | | | | | | | | | |
| 32–56 | Ditto to 7–31 | | | | | O | | | | | | | | |
| 57–81 | Ditto to 7–31 | | | | | O | O | | | | | | | |
| 82–106 | Ditto to 7–31 | | | | | O | O | O | | | | | | |
| 107–131 | Ditto to 7–31 | | | | | O | O | O | O | | | | | |
| 132–156 | Ditto to 7–31 | | | | | O | O | O | O | O | | | | |
| 157–181 | Ditto to 7–31 | | | | | O | O | O | O | O | O | | | |
| 182–206 | Ditto to 7–31 | | | | | O | O | O | O | O | O | O | | |
| 207–231 | Ditto to 7–31 | | | | | O | O | O | O | O | O | O | O | |
| 232–255 | Ditto to 8–31 | | | | | O | O | O | O | O | O | O | O | O |

The way to read these tables is as follows. A "O" indicates an active subfield. They indicate combinations of subfields, showing which subfields can be utilized to produce a desired level of gradations.

For example, for subfield number 12 shown in Table 11, to produce a gradation of level 6, subfields SF2 (weighted 2) and SF3 (weighted 4) can be used. Further, in Table 11, to produce a gradation of level 100, subfields SF3 (weighted 4), SF6 (weighted 32), SF7 (weighted 32), SF8 (weighted 32) can be used. Table 7–Table 13 only show the 1-times mode. For an N-times mode (N is an integer from 1 to 6), a value of a pulse number that has been multiplied N times can be used.

Figures 9A, 9B:
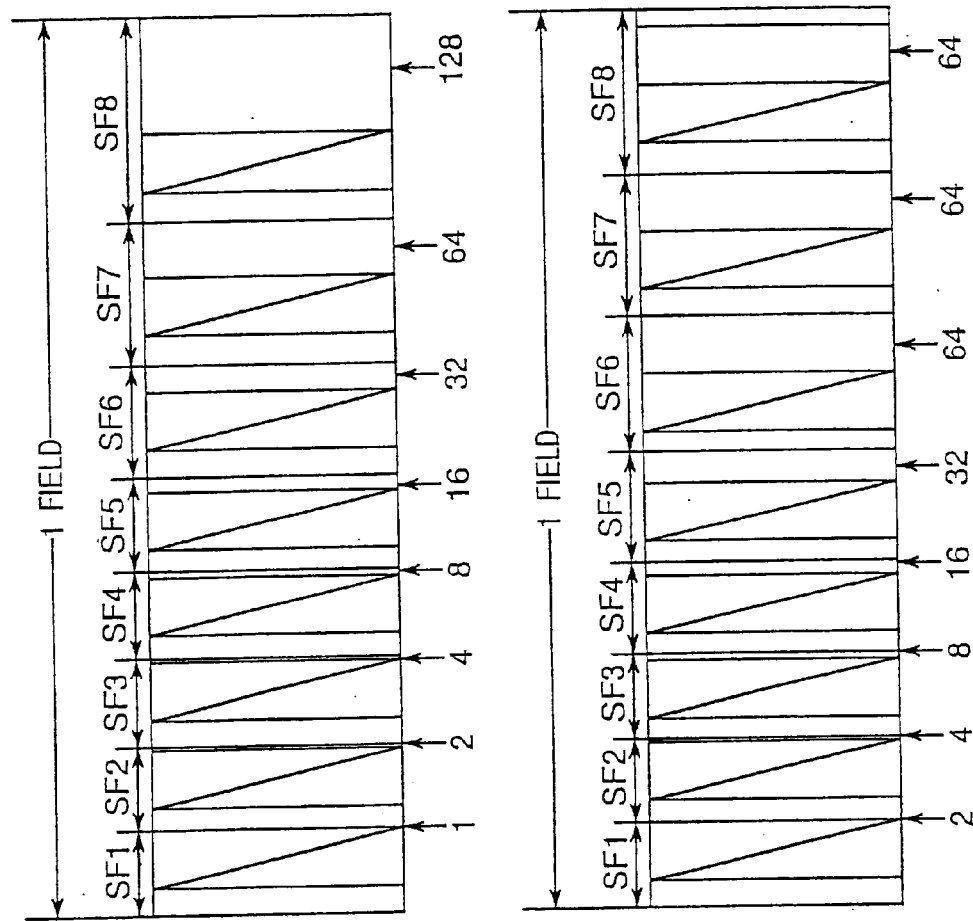
FIGS. 9A and 9B shows waveform diagrams of a standard form of PDP driving signal with different numbers of gradations.

FIG. 9A shows a standard form PDP driving signal, and FIG. 9B shows a PDP driving signal, when the gradation display points have been reduced, that is, when the level difference is 2 (when the level difference of a standard form is 1). In the case of the standard form in FIG. 9A, brightness levels from 0 to 255 can be displayed in one pitch using 256 different gradation display points (0, 1, 2, 3, 4, 5, . . . , 255). In the case of the variation in FIG. 9B, brightness levels from 0 to 254 can be displayed in two pitches using 128 different gradation display points (0, 2, 4, 6, 8, . . . , 254). By enlarging the level difference (that is, decreasing the number of gradation display points) in this way without changing the number of subfields, the weight of the subfield with the greatest weight can be reduced, and as a result, pseudo-contour noise can be reduced.

Table 14, Table 15, Table 16, Table 17, Table 18, Table 19, Table 20 shown below are gradation level difference tables for various subfields, and indicate when the number of gradation display points differ.

TABLE 14

Gradation Level Difference Table for Eight Subfields

| Number of Gradation Display Points | Number of Pulses (Weight) in Each Subfield | | | | | | | | |
|---|---|---|---|---|---|---|---|---|---|
| | SF 1 | SF 2 | SF 3 | SF 4 | SF 5 | SF 6 | SF 7 | SF 8 | $S_{max}$ |
| 256 | 1 | 2 | 4 | 8 | 16 | 32 | 64 | 128 | 255 |
| 128 | 2 | 4 | 8 | 16 | 32 | 64 | 64 | 64 | 254 |
| 64 | 4 | 8 | 16 | 32 | 48 | 48 | 48 | 48 | 252 |

TABLE 15

Gradation Level Difference Table for Nine Subfields

| Number of Gradation Display Points | Number of Pulses (Weight) in Each Subfield | | | | | | | | | |
|---|---|---|---|---|---|---|---|---|---|---|
| | SF 1 | SF 2 | SF 3 | SF 4 | SF 5 | SF 6 | SF 7 | SF 87 | SF 9 | $S_{max}$ |
| 256 | 1 | 2 | 4 | 8 | 16 | 32 | 64 | 64 | 64 | 255 |
| 128 | 2 | 4 | 8 | 16 | 32 | 48 | 48 | 48 | 48 | 254 |
| 64 | 4 | 8 | 16 | 32 | 39 | 39 | 39 | 39 | 36 | 252 |

TABLE 16

Gradation Level Difference Table for Ten Subfields

| Number of Gradation Display Points | Number of Pulses (Weight) in Each Subfield | | | | | | | | | | |
|---|---|---|---|---|---|---|---|---|---|---|---|
| | SF 1 | SF 2 | SF 3 | SF 4 | SF 5 | SF 6 | SF 7 | SF 8 | SF 9 | SF 10 | $S_{max}$ |
| 256 | 1 | 2 | 4 | 8 | 16 | 32 | 48 | 48 | 48 | 48 | 255 |
| 128 | 2 | 4 | 8 | 16 | 32 | 39 | 39 | 39 | 39 | 36 | 254 |
| 64 | 4 | 8 | 16 | 32 | 32 | 32 | 32 | 32 | 32 | 32 | 252 |

TABLE 17

Gradation Level Difference Table for Eleven Subfields

| Number of Gradation | Number of Pulses (Weight) in Each Subfield | | | | | | | | | | | |
|---|---|---|---|---|---|---|---|---|---|---|---|---|
| Display Points | SF1 | SF2 | SF3 | SF4 | SF5 | SF6 | SF7 | SF8 | SF9 | SF10 | SF11 | $S_{max}$ |
| 256 | 1 | 2 | 4 | 8 | 16 | 32 | 39 | 39 | 39 | 39 | 36 | 255 |
| 128 | 2 | 4 | 8 | 16 | 28 | 28 | 28 | 28 | 28 | 28 | 28 | 254 |
| 64 | 4 | 8 | 16 | 25 | 25 | 25 | 25 | 25 | 25 | 25 | 24 | 252 |

TABLE 18

Gradation Level Difference Table for Twelve Subfields

| Number of Gradation | Number of Pulses (Weight) in Each Subfield | | | | | | | | | | | | |
|---|---|---|---|---|---|---|---|---|---|---|---|---|---|
| Display Points | SF1 | SF2 | SF3 | SF4 | SF5 | SF6 | SF7 | SF8 | SF9 | SF10 | SF11 | SF12 | $S_{max}$ |
| 256 | 1 | 2 | 4 | 8 | 16 | 32 | 32 | 32 | 32 | 32 | 32 | 32 | 255 |
| 128 | 2 | 4 | 8 | 16 | 28 | 28 | 28 | 28 | 28 | 28 | 28 | 28 | 254 |
| 64 | 4 | 8 | 16 | 25 | 25 | 25 | 25 | 25 | 25 | 25 | 25 | 24 | 252 |

TABLE 19

Gradation Level Difference Table for Thirteen Subfields

| Number of Gradation | Number of Pulses (Weight) in Each Subfield | | | | | | | | | | | | | |
|---|---|---|---|---|---|---|---|---|---|---|---|---|---|---|
| Display Points | SF1 | SF2 | SF3 | SF4 | SF5 | SF6 | SF7 | SF8 | SF9 | SF10 | SF11 | SF12 | SF13 | $S_{max}$ |
| 256 | 1 | 2 | 4 | 8 | 16 | 28 | 28 | 28 | 28 | 28 | 28 | 28 | 28 | 255 |
| 128 | 2 | 4 | 8 | 16 | 25 | 25 | 25 | 25 | 235 | 25 | 25 | 25 | 24 | 254 |
| 64 | 4 | 8 | 16 | 23 | 23 | 23 | 23 | 23 | 23 | 23 | 23 | 23 | 17 | 52 |

TABLE 20

Gradation Level Difference Table for Fourteen Subfields

| Number of Gradation | Number of Pulses (Weight) in Each Subfield | | | | | | | | | | | | | | |
|---|---|---|---|---|---|---|---|---|---|---|---|---|---|---|---|
| Display Points | SF1 | SF2 | SF3 | SF4 | SF5 | SF6 | SF7 | SF8 | SF9 | SF10 | SF11 | SF12 | SF13 | SF14 | $S_{max}$ |
| 256 | 1 | 2 | 4 | 8 | 16 | 25 | 25 | 25 | 25 | 25 | 25 | 25 | 25 | 24 | 255 |
| 128 | 2 | 4 | 8 | 16 | 23 | 23 | 23 | 23 | 23 | 23 | 23 | 23 | 23 | 17 | 254 |
| 64 | 4 | 8 | 16 | 21 | 21 | 21 | 21 | 21 | 21 | 21 | 21 | 21 | 21 | 14 | 252 |

The way to read these tables is as follows. For example, Table 17 is a gradation level difference table when the subfield number is 11. The first row shows the weight of each subfield when the number of gradation display points is 256, the second row shows the weight of each subfield when the number of gradation display points is 128, and the third row shows the weight of each subfield when the number of gradation display points is 64. Smax, the maximum gradation display points that can be displayed (that is, the maximum possible brightness level), is indicated on the right end.

FIG. 10A shows a standard form PDP driving signal, and FIG. 10B shows a PDP driving signal when the vertical synchronizing frequency is high. For an ordinary television signal, the vertical synchronizing frequency is 60 Hz, but since the vertical synchronizing frequency of a personal computer or other picture signal has a frequency higher than 60 Hz, for example 72 Hz, one field time becomes substantially shorter. Meanwhile, since there is no change in the frequency of the signal to the scanning electrode or data electrode for driving a PDP, the number of subfields capable of being introduced into a shortened one field time decreases. FIG. 10B shows a PDP driving signal when subfields weighted 1 and 2 are eliminated, and the number of subfields is 10.

Figure 11:
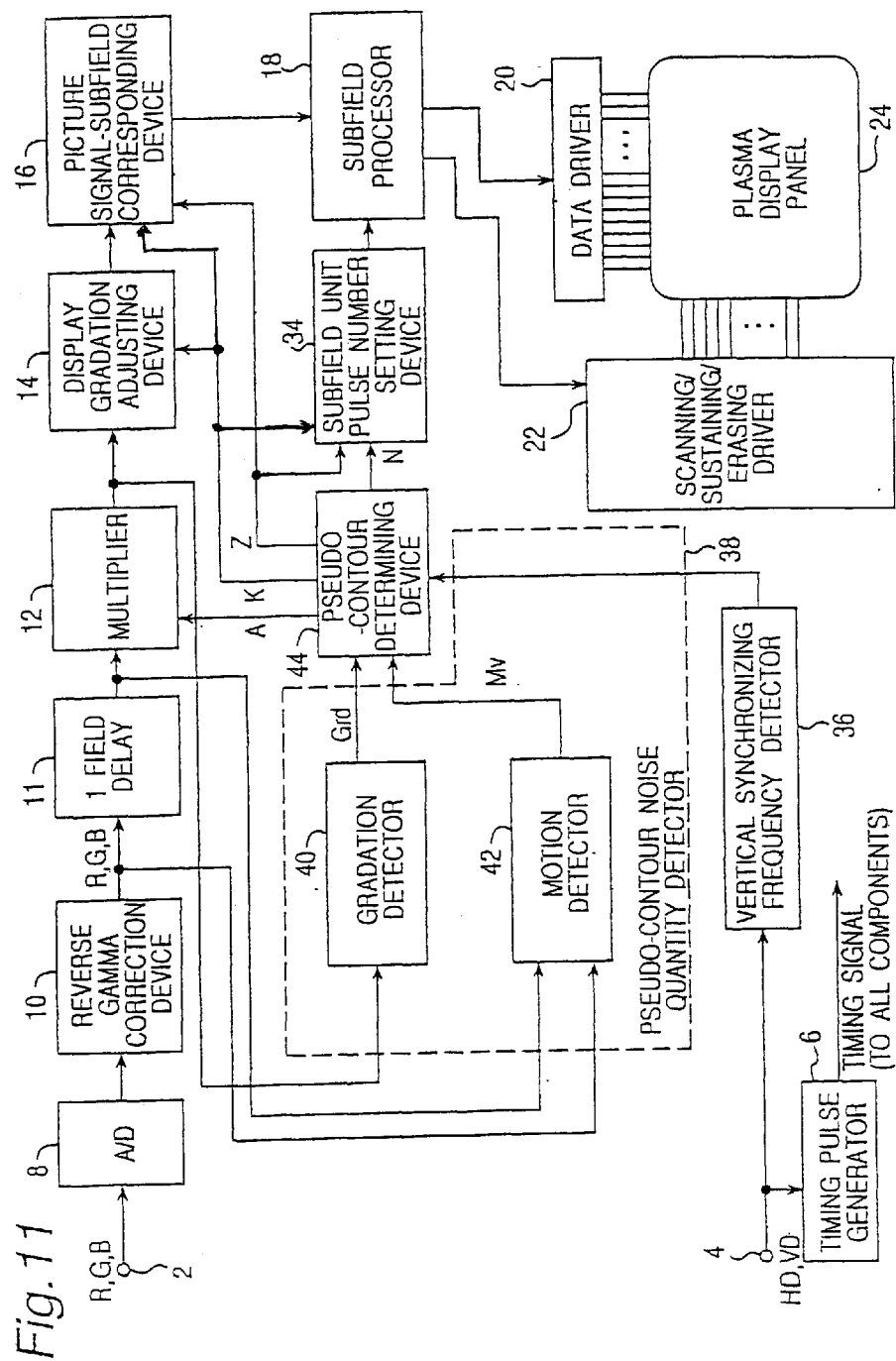
FIG. 11 shows a block diagram of a display apparatus of a first embodiment.

Next, the preferred embodiments are described in detail.
(First Embodiment)
FIG. 11 shows a block diagram of a display apparatus of a first embodiment. As shown in this figure, the display apparatus comprises a terminal 2 for inputting image, a reverse gamma correction device 10, a 1 field delay 11, a multiplier 12, a display gradation adjusting device 14, a picture signal-subfield corresponding device 16, a subfield processor 18, and a plasma display panel (PDP) 24. A data driver 20, and a scanning/sustaining/erasing driver 22 are connected to the plasma display panel 24. The display apparatus further comprises a terminal 4 for inputting synchronization signals, a timing pulse generator 6, a vertical synchronizing frequency detector 36, a pseudo-contour noise quantity detector 38, a pseudo-contour determining device 44, and a subfield unit pulse number setting device 34.

The image input terminal 2 receives R, G, B signals. The synchronization input terminal 4 receives a vertical synchronizing signal, horizontal synchronizing signal, and send these to a timing pulse generator 6. An A/D converter 8 receives R, G, B signals and performs A/D conversion. A/D converted R, G, B signals undergo reverse gamma correction via the reverse gamma correction device 10. Prior to reverse gamma correction, the level of each of the R, G, B signals from a minimum 0 to a maximum 255 is displayed in one pitch in accordance with an 8-bit signal as 256 linearly different levels (0, 1, 2, 3, 4, 5, . . . , 255). Following reverse gamma correction, the levels of the R, G, B signals, from a minimum 0 to a maximum 255, are each displayed with an accuracy of roughly 0.004 in accordance with a 16-bit signal as 256 non-linearly different levels.

Post-reverse gamma correction R, G, B signals are sent to a 1 field delay 11, and, after being delayed one field by the 1 field delay 11, are sent to a multiplier 12.

The multiplier 12 receives the multiplication factor A from a pseudo-contour determining device 44, and multiplies the respective R, G, B signals A times. In accordance with this, the entire screen becomes A-times brighter. Furthermore, the multiplier 12 receives a 16-bit signal, which is expressed out to the third decimal place for the respective R, G, B signals, and after using a prescribed operation to perform carry processing from a decimal place, the multiplier 12 once again outputs a 16-bit signal.

The display gradation adjusting device 14 receives gradation display points K from the pseudo-contour determining device 44. The display gradation adjusting device 14 changes the brightness signal (16 bit), which is expressed in detail out to the third decimal place, to the nearest gradation display point (8-bit). For example, assume the value output from the multiplier 12 is 153.125. As an example, if the number of gradation display points K is 128, since a gradation display point can only take an even number, it changes 153.125 to 154, which is the nearest gradation display point. As another example, if the number of gradation display points K is 64, since a gradation display point can only take a multiplier of 4, it changes 153.125 to 152 (=4×38), which is the nearest gradation display point. In this manner, the 16-bit signal received by the display gradation adjusting device 14 is changed to the nearest gradation display point on the basis of the value of the number of gradation display points K, and this 16-bit signal is output as an 8-bit signal.

The picture signal-subfield corresponding device 16 receives the number of subfields Z and the number of gradation display points K, and changes the 8-bit signal sent from the display gradation adjusting device 14 to a Z-bit signal. As a result of this change, the above-mentioned Table 7–Table 20 are stored in the picture signal-subfield corresponding device 16.

As one example, assume that the signal from the display gradation adjusting device 14 is 152, for instance, the number of subfields Z is 10, and the number of gradation display points K is 256. In this case, in accordance with Table 16, it is clear that the 10-bit weight from the lower bit is 1, 2, 4, 8, 16, 32, 48, 48, 48, 48.

Furthermore, by looking at Table 9, the fact that 152 is expressed as (0001111100) can be ascertained from the table. This ten bits is output to a subfield processor 18. As another example, assume that the signal from the display gradation adjusting device 14 is 152, for instance, the number of subfields Z is 10, and the number of gradation display points K is 64. In this case, in accordance with Table 16, it is clear that the 10-bit weight from the lower bit is 4, 8, 16, 32, 32, 32, 32, 32, 32, 32.

Furthermore, by looking at the upper 10-bit portion of Table 11 (Table 11 indicates a number of gradation display points of 256, and a subfield number of 12, but the upper 10 bits of this table is the same as when the number of gradation display points is 64, and the subfield number is 10), the fact that 152 is expressed as (0111111000) can be ascertained from the table. This ten bits is output to the subfield processor 18.

The subfield processor 18 receives data from a subfield unit pulse number setting device 34, and decides the number of sustaining pulses output during sustain period P3. Table 1–Table 6 are stored in the subfield unit pulse number setting device 34. The subfield unit pulse number setting device 34 receives from the pseudo-contour determining device 44 the value of the N-times mode N, the number of subfields Z, and the number of gradation display points K, and specifies the number of sustaining pulses required in each subfield.

As an example, assume, for instance, that it is the 3-times mode (N=3), the subfield number is 10 (Z=10), and the number of gradation display points is 256 (K=256). In this case, in accordance with Table 3, judging from the row in which the subfield number is 10, sustaining pulses of 3, 6, 12, 24, 48, 96, 144, 144, 144, 144 are outputted for each of subfields SF1, SF2, SF3, SF4, SF5, SF6, SF7, SF8, SF9, SF10, respectively. In the above-described example, since 152 is expressed as (0001111100), a subfield corresponding to a bit of "1" contributes to light emission. That is, a light emission equivalent to a sustaining pulse portion of 456 (=24+48+96+144+144) is achieved. This number is exactly equivalent to 3 times 152, and the 3-times mode is executed.

As another example, assume, for instance, that it is the 3-times mode (N=3), the subfield number is 10 (Z=10), and the number of gradation display points is 64 (K=64). In this case, in accordance with Table 3, judging from subfields SF3, SF4, SF5, SF6, SF7, SF8, SF9, SF10, SF11, SF12 of the row in which the subfield number is 12 (The row in Table 3 in which the subfield number is 12 has a number of gradation display points of 256, and the subfield number is 12, but the upper 10 bits of this row is the same as when the number of gradation display points is 64 and the subfield number is 10. Therefore, subfields SF3, SF4, SF5, SF6, SF7, SF8, SF9, SF10, SF11, SF12 of the row in which the subfield number is 12 correspond to subfields SF1, SF2, SF3, SF4, SF5, SF6, SF7, SF8, SF9, SF10 when the subfield number is 10.), sustaining pulses of 12, 24, 48, 96, 96, 96, 96, 96, 96, 96 are outputted for each, respectively. In the above-described example, since 152 is expressed as (0111111000), a subfield corresponding to a bit of "1" contributes to light emission.

That is, a light emission equivalent to a sustaining pulse portion of 456 (=24+48+96+96+96+96+96) is achieved. This number is exactly equivalent to 3 times 152, and the 3-times mode is executed.

In the above-described example, the required number of sustaining pulses can also be determined via calculations without relying on Table 3, by multiplying the 10-bit weight obtained in accordance with Table 16 by N (This is 3 times in the case of the 3-times mode.). Therefore, the subfield unit pulse number setting device 34 can provide an N-times calculation formula without storing Table 1 through Table 6. Further, the subfield unit pulse number setting device 34 can also set a pulse width by changing to a pulse number that accords with the type of display panel.

Pulse signals required for setup period P1, write period P2 and sustain period P3 are applied from the subfield processor 18, and a PDP driving signal is outputted. The PDP driving signal is applied to a data driver 20, and a scanning/sustaining/erasing driver 22, and a display is outputted to a plasma display panel 24.

A vertical synchronizing frequency detector 36 detects a vertical synchronizing frequency. The vertical synchronizing frequency of an ordinary television signal is 60 Hz (standard frequency), but the vertical synchronizing frequency of the picture signal of a personal computer or the like is a frequency higher than the standard frequency, for example, 72 Hz. When the vertical synchronizing frequency is 72 Hz, one field time becomes 1/72 second, and is shorter than the ordinary 1/60 second. However, since the setup pulse, writing pulse and sustaining pulse that comprise a PDP driving signal do not change, the number of subfields that can be introduced into one field time decreases. In this case, subfields SF1 and SF2 are omitted, which are respectively the least significant bit and the second lower bit, the number of gradation display points K is set at 64, and a 4-times gradation display point is selected. That is, when the vertical synchronizing frequency detector 36 detects a vertical synchronizing frequency that is higher than a standard frequency, it sends a signal specifying the contents thereof to the pseudo-contour determining device 44, and the pseudo-contour determining device 44 reduces the number of gradation display points K. Processing similar to that described above is performed for the number of gradation display points K.

A gradation detector 40 receives R, G, B signals from the multiplier 12, and detects the gradations of brightness on a screen for each signal. When a change from a bright place to a dark place (or vice-versa) changes continuously within a specified range, the gradation signal Grd to be outputted is large, while when this change is sharp or gentle, the gradation signal Grd is small.

A motion detector 42 receives both an input signal and an output signal of the 1 field delay 11, and detects an extent of motion of the picture displayed on a screen based on these signals. When the motion of the picture is great, a motion signal Mv output from the motion detector 42 is large, while when it is small, a motion signal Mv is small.

The pseudo-contour determining device 44 receives first of all a gradation signal Grd and a motion signal Mv, and assesses the quantity of the pseudo-contour noise MPD. When both signals Grd and Mv are large, the quantity of the pseudo-contour noise is assessed to be large. Meanwhile, when both signals Grd and Mv are small, the quantity of the pseudo-contour noise is assessed to be small. In this manner, the pseudo-contour determining device 44 first generates an assessing value MPDa.

Furthermore, the pseudo-contour determining device 44 determines the values of 4 parameters: an N-times mode value N; a fixed multiplication value A of the multiplier 12; a subfield number Z; gradation display point number K, on the basis of the pseudo-contour noise assessing value MPDa. The 4 parameters can be determined using the map shown in FIG. 14, for example. The determined 4 parameters are outputted from the pseudo-contour determining device 44, and a desired PDP driving signal, which accords with these parameters, is outputted from the subfield processor 18.

Figure 12:
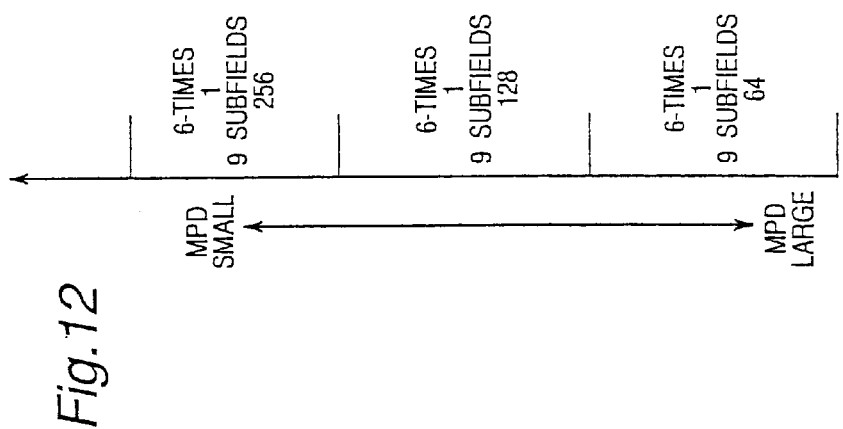
FIG. 12 shows a development schematic of map for determining parameters held in pseudo-contour determining device in the first embodiment.

FIG. 12 is a map for determining 4 parameters (mode multiplier (N), multiplication factor (A), number of subfields (Z), number of gradation display points (K)) in accordance with a pseudo-contour noise assessing value MPDa. In this figure, the 4 numerical values shown inside each segment indicate, in order from the top, an N-times mode value (N), a multiplication value (A) of the multiplier 12, a number of subfields (Z), and a number of gradation display points (K). The same also holds true for maps shown below.

As is clear from this figure, when the pseudo-contour noise assessing value MPDa is large, since the pseudo-contour noise is need to be suppressed, the number of gradation display points K is reduced, and as is shown in Table 14 through Table 20 the weight of the subfield in an upper bit is reduced. Pseudo-contour noise can also be suppressed by changing another parameter. For example, when the pseudo-contour noise assessing value MPDa becomes large, the number of subfields can be increased.

In accordance with this embodiment, it is possible to change a PDP driving signal only when pseudo-contour noise is expected to appear. Therefore, when pseudo-contour noise is not expected to appear, a PDP driving signal for standard or intensified brightness can be utilized. That is, when pseudo-contour noise is not expected to appear, degradation of image quality can be prevented.

(Second Embodiment)

Figure 13:
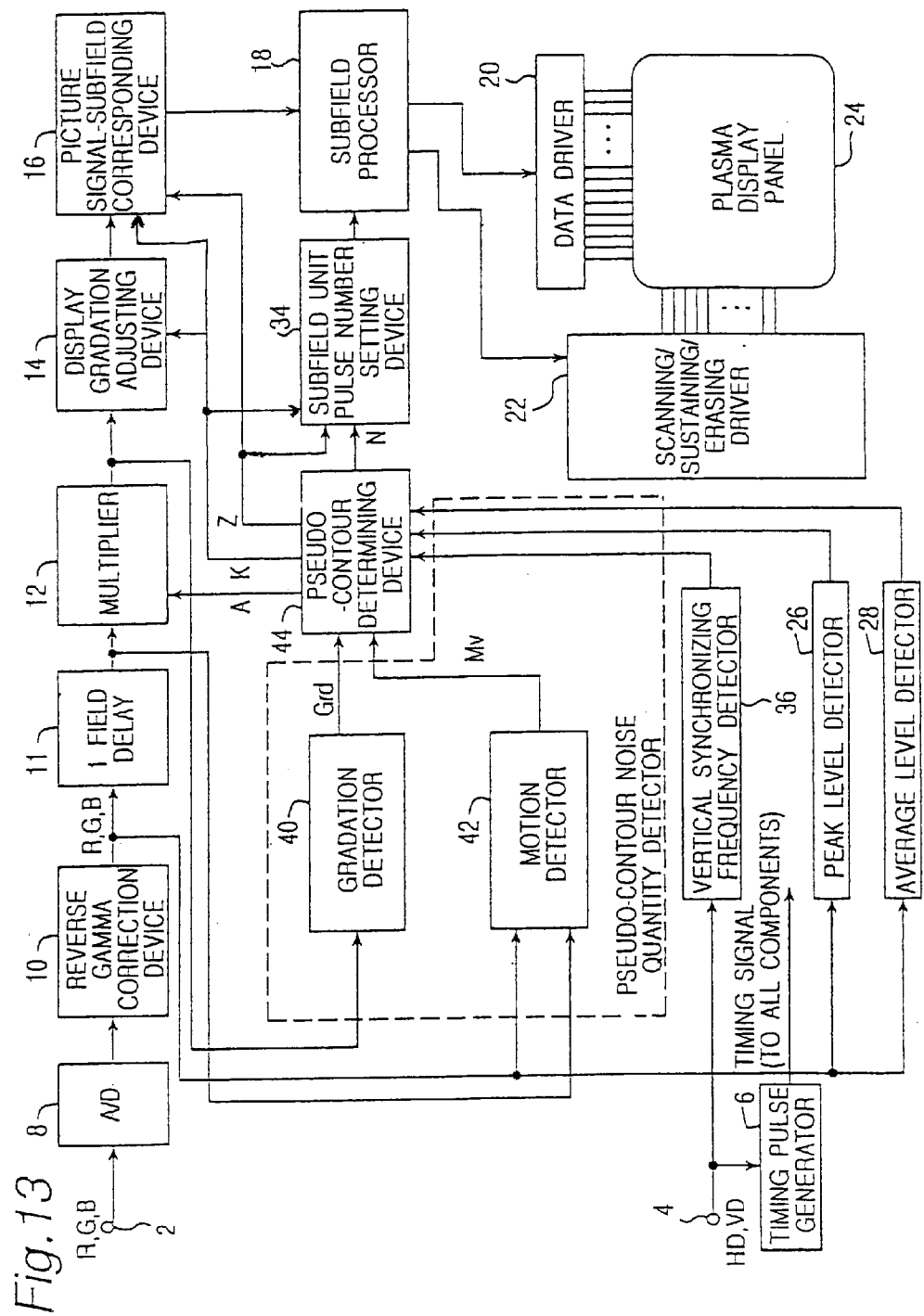
FIG. 13 shows a block diagram of a display apparatus of a second embodiment.

FIG. 13 shows a block diagram of a display apparatus of a second embodiment. This display apparatus further comprises a peak level detector 26 and an average level detector 28 to the block diagram of FIG. 11.

The peak level detector 26 detects an R signal peak level Rmax, a G signal peak level Gmax, and a B signal peak level Bmax in the data of 1 field, and also detects the peak level Lpk of Rmax, Gmax and Bmax. That is, the peak level detector 26 detects the brightest value in one field.

The average level detector 28 seeks an R signal average value Rav, a G signal average value Gav, and a B signal average value Bav for data in one field, and also determines the average level Lav of Rav, Gav and Bav. That is, the average level detector 26 determines the average value of the brightness in one field.

The pseudo-contour determining device 44 of the display apparatus of this embodiment can determine 4 parameters using three signals including signal Lav from the average level detector 28, signal Grd from the gradation detector 40 and signal Mv from the motion detector 42. It can also determine 4 parameters using four signals including signal Lpk from the peak level detector 26 in addition to above three signals. The former is called the GMA pseudo-contour determining mode, and the latter is called the GMAP pseudo-contour determining mode.

Figure 14:
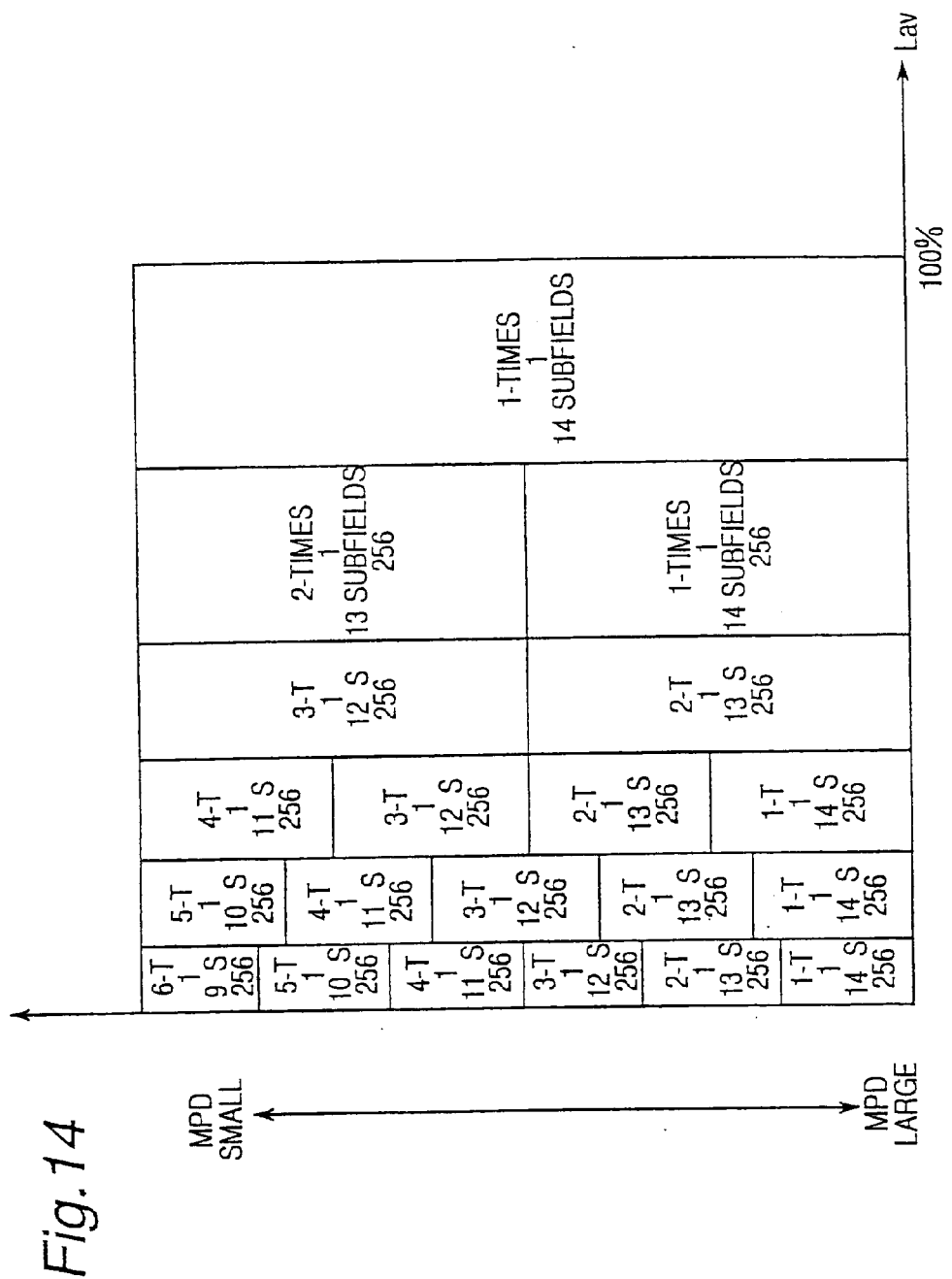
FIG. 14 shows a development schematic of map for determining parameters held in pseudo-contour determining device in the second embodiment.

The GMA pseudo-contour determining mode is explained with reference to FIG. 14. FIG. 14 is a map for determining the parameters used in a GMA pseudo-contour determining mode of the second embodiment. The horizontal axis represents the average level Lav, and the vertical axis represents the assessing value MPDa. First, the area enclosed by the vertical axis and the horizontal axis is divided into a plurality of columns, 6 columns in the example in FIG. 14, by lines parallel to the vertical axis. Then, the vertical columns are further divided by lines parallel to the horizontal axis, creating a plurality of segments, where the more segments are created in the column as the average level decreases. The example in FIG. 14 is divided into a total of 20 segments. The segments can also be formed using another partitioning method. The above-mentioned 4 parameters N, A, Z, K are specified for each segment.

For example, the segment in the upper left of FIG. 14 is selected when the average level Lav is low and the assessing value MPDa is small. Such an image, for example, might be an image in which a still star can be seen shining brightly in the night sky. For this upper-left segment, a 6-times mode is employed, the multiplication factor is set at 1, the number of subfield is 9, and the number of gradation display points is 256. By setting the 6-times mode in particular, since a bright part is more brightly highlighted, the star can be seen as shining more brightly.

Further, the segment in the lower left of FIG. 14 is selected when the average level Lav is low and the assessing value MPDa is large. Such an image, for example, might be an image in which a plurality of large shooting stars can be seen shining brightly in the night sky. For this lower-left segment, a 1-times mode is employed, the multiplication factor is set at 1, the number of subfields is 14, and the number of gradation display points is 256.

Next, the GMAP pseudo-contour determining mode is explained with reference to FIGS. 15, 16 and 17. Here, FIGS. 15, 16 and 17 are maps for determining parameters utilized when respective assessing values MPDa are assessed as being small, medium and large, respectively.

Figure 15:
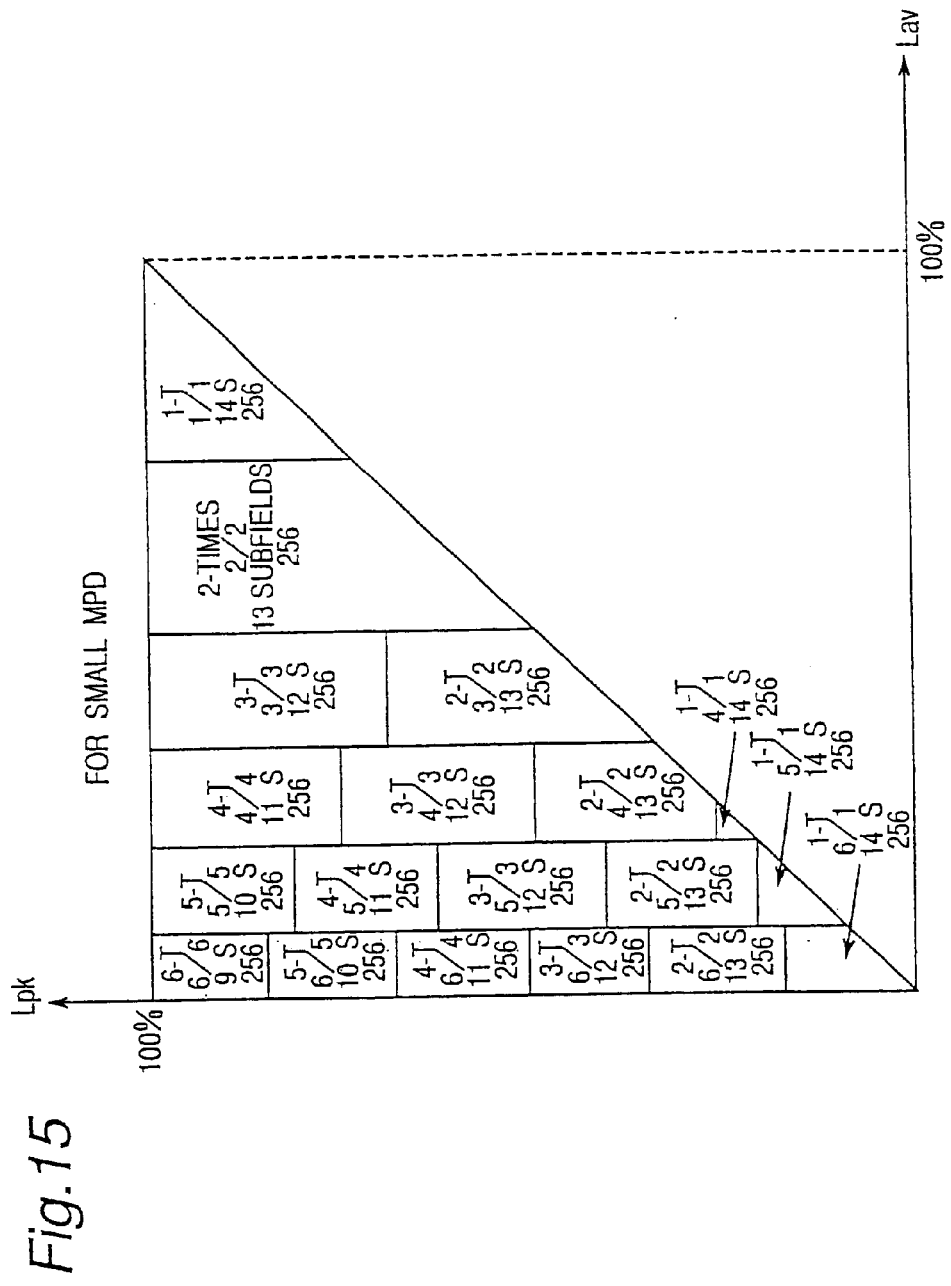
FIG. 15 shows a development schematic of map f or determining parameters held in pseudo-contour determining device of the second embodiment when there are few pseudo-contour noise.
Figure 16:
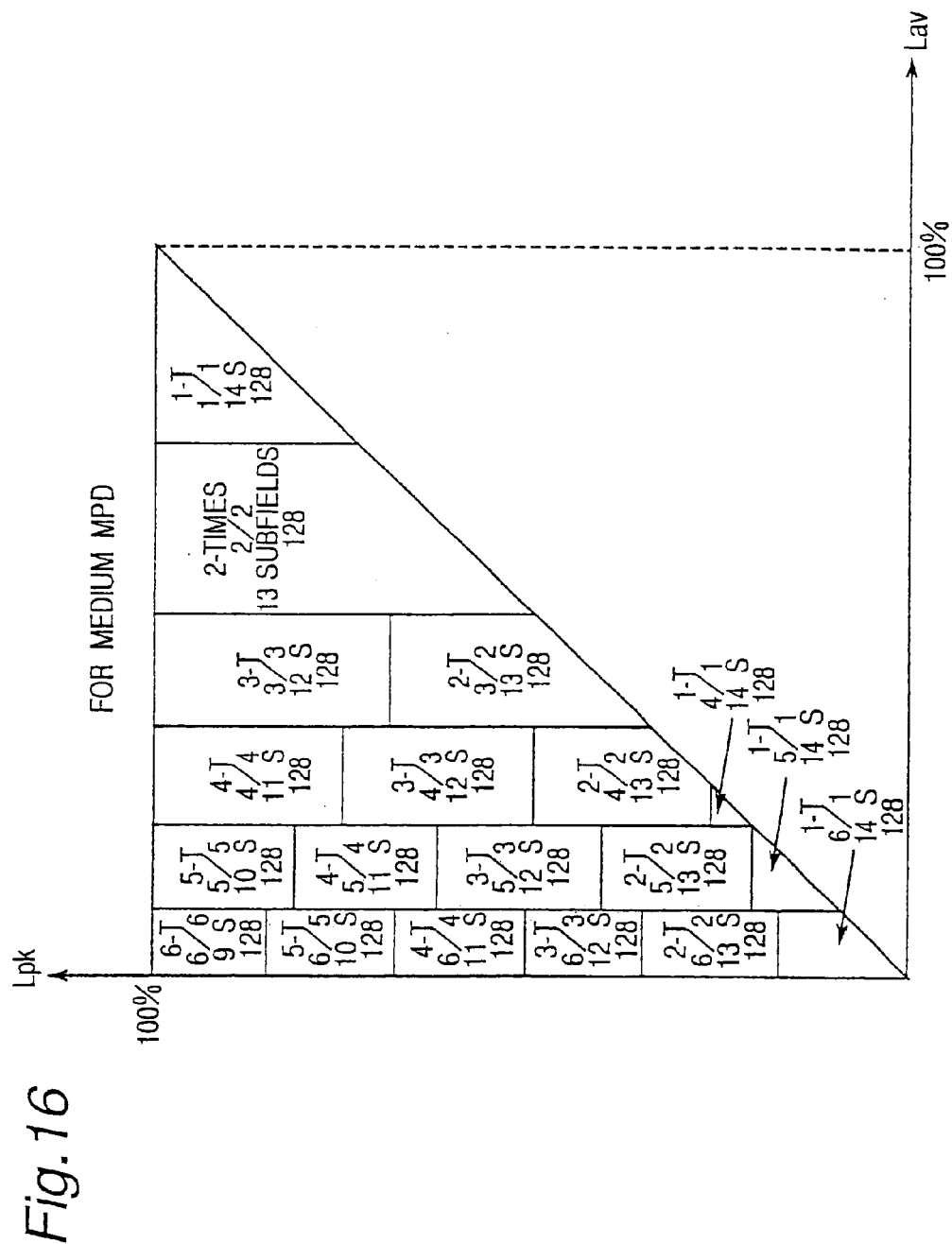
FIG. 16 shows a development schematic of map for determining parameters held in pseudo-contour determining device of the second embodiment when there are moderate pseudo-contour noise.
Figure 17:
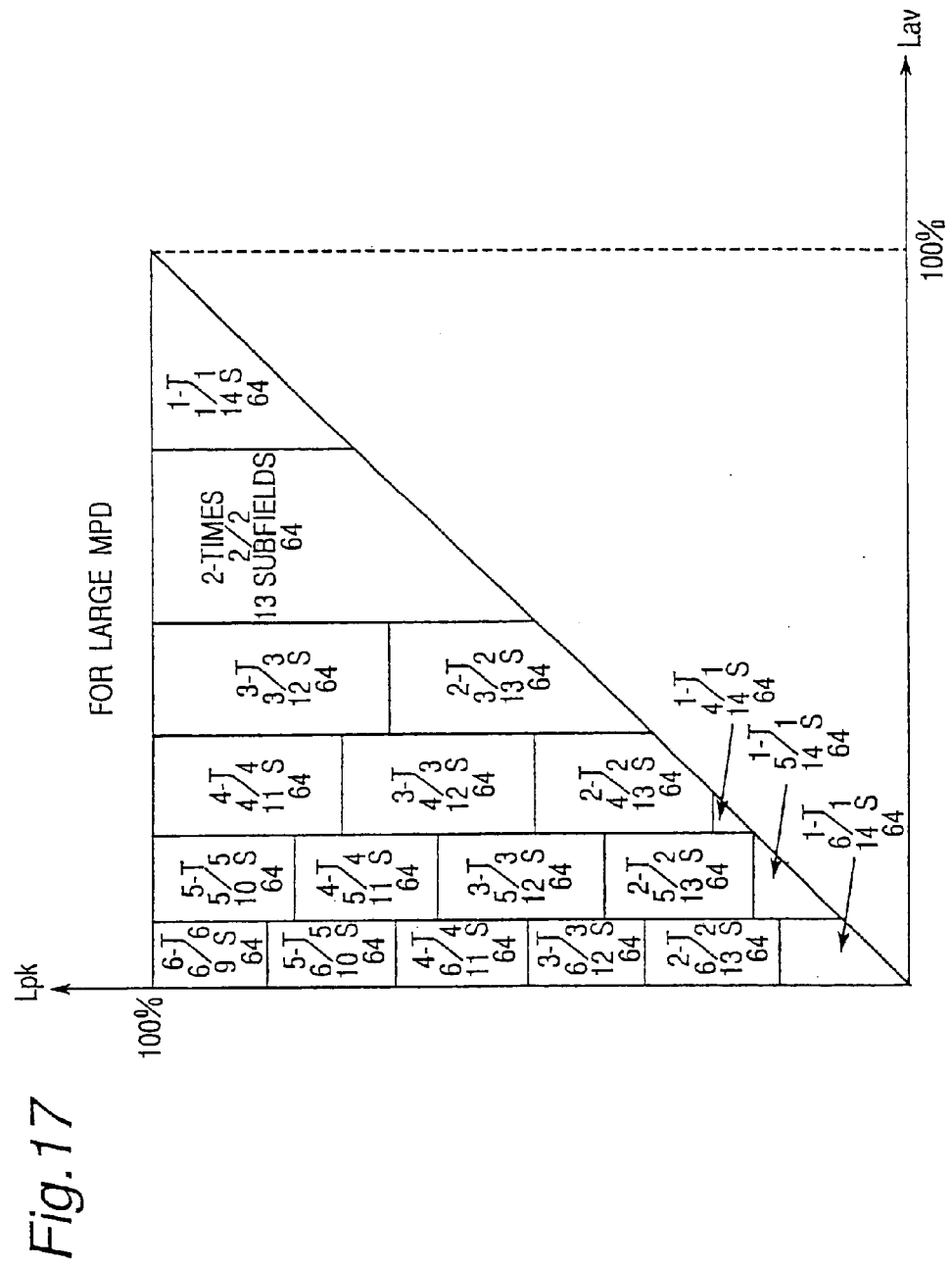
FIG. 17 shows a development schematic of map for determining parameters held in pseudo-contour determining device of the -second embodiment when there are numerous pseudo-contour noise.

In FIGS. 15, 16 and 17, the horizontal axis represents the average level Lav, and the vertical axis represents the peak level Lpk. Since a peak level is always larger than an average level, the map exists only inside a triangular area above a 45 diagonal line. The triangular area is divided into a plurality of column, 6 columns in the example of FIG. 15, by lines that parallel the vertical axis. Further, the vertical columns are divided by lines that parallel the horizontal axis, creating a plurality of segments. In the example of FIG. 15, a total of 19 segments are formed. The above-mentioned 4 parameters, N, A, Z, K, are specified for each segment. In FIG. 15, the 4 numerical values shown inside each segment specify, in order from the top, the values of 4 parameters: an N-times mode value (N); a multiplication value (A) of the multiplier 12; a number of subfields (Z); and a number of gradation display points (K).

For example, the segment in the upper left of FIG. 15 is selected for an image in which the average level Lav is low, and the peak level Lpk is high. Such an image, for example, might be an image in which a star can be seen shining brightly in the night sky. For this upper-left segment, a 6-times mode is employed, the multiplication factor is set at 1, the number of subfields is 9, and the number of gradation display points is 256. By setting the 6-times mode in particular, since a bright place is more brightly highlighted, the star can be seen as shining brightly.

Further, the segment in the lower left of FIG. 15 is selected for an image in which the average level Lav is low and the peak level Lpk is low. Such an image, for example, might be an image of a human form faintly visible on a dark night. For this lower left segment, a 1-times mode is employed, the fixed multiplication factor is set at 6, the subfield number is 14, and the gradation display point number is 256. By setting the multiplication factor at 6 in particular, the gradation display of low luminance parts is improved, and a human form is displayed more clearly.

As is clear from the above, the weighting multiplier N is increased as the average level (Lav) of brightness decreases. An image becomes darker and harder to see as the average level (Lav) of brightness becomes lower. For such an image, increasing the weighting multiplier N can make an entire screen brighter.

Further, the subfield number Z is decreased as the average level (Lav) of brightness decreases. An image becomes darker and harder to see as the average level (Lav) of brightness becomes lower. For such an image, decreasing a number of subfields Z can increase weights of subfields, and thereby an entire screen can be made brighter.

Further, the multiplication factor A is increased as the average level (Lav) of brightness decreases. An image becomes darker and harder to see as the average level (Lav) of brightness becomes lower. For such an image, increasing the multiplication factor A can make an image brighter overall, and moreover, can improve gradation characteristics.

Further, the weighting multiplier N is decreased as the peak level (Lpk) of brightness decreases. When the peak level (Lpk) of brightness becomes lower, an entire image becomes a dark area in addition to the image brightness changing width becoming narrower. By decreasing the weighting multiplier N for such an image, the changing width of the luminance between display gradations becomes smaller, enabling the rendering of fine gradation changes even in the dark image, and making it possible to improve gradation characteristics.

Further, the subfield number Z is increased as the peak level (Lpk) of brightness decreases. When the peak level (Lpk) of brightness becomes lower, the image brightness changing width becoming narrower, and further an entire image becomes dark. For such an image, the weight of a subfield can be reduced even when the subfield is rounded up or rounded down. Therefore, increasing the number of subfields Z allows the weight of the subfield to be small to make pseudo-contour noise weaken even in the case that the pseudo-contour noise appears.

Further, the multiplication factor A is increased as the peak level (Lpk) of brightness decreases. When the peak level of brightness (Lpk) becomes lower, the image brightness changing width becoming narrower, and further an entire image becomes dark. By increasing the multiplication factor A for such an image, it is possible to make a distinct change in brightness even when the image is dark, and to improve gradation characteristics. The same also holds true for FIGS. 16 and 17.

In FIG. 15, which shows a map in the case where an assessing value MPDa is small, the number of the gradation display points K is a large value (256). In FIG. 16, which shows a map in the case where an assessing value MPDa is medium, the number of the gradation display points K is a medium value (128). In FIG. 17, which shows a map in the case where an assessing value MPDa is large, the number of the gradation display points K is a small value (64).

The GMAP pseudo-contour determining mode intensifies the brightness of a dark picture more than the GMA pseudo-contour determining mode. The mode can be switched between the GMAP pseudo-contour determining mode and the GMA pseudo-contour determining mode in accordance with the preference of a user. Further, it is also possible to provide only one, either the GMAP pseudo-contour determining mode, or the GMA pseudo-contour determining mode. When the GMA pseudo-contour determining mode is provided, the peak level detector 26 can be omitted.

(Third Embodiment)

Figure 18:
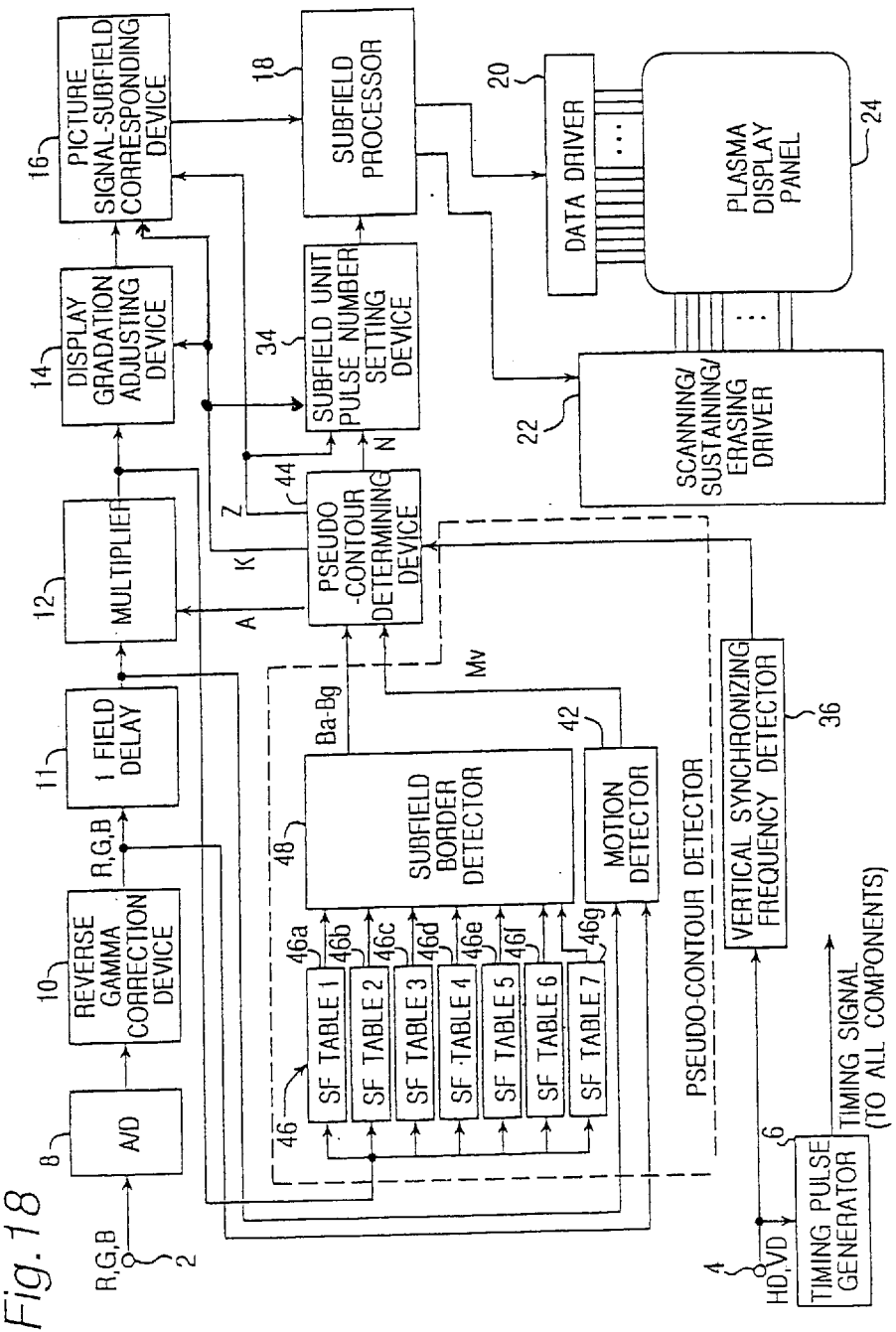
FIG. 18 shows a block diagram of a display apparatus of a third embodiment.

FIG. 18 shows a block diagram of a display apparatus of a third embodiment. In the first embodiment (FIG. 11), determination of pseudo-contour noise is performed using a pseudo-contour assessing value MPDa. In this embodiment, however, a pseudo-contour measuring value MPDr is utilized on the determination of pseudo-contour noise. Other than that, the display apparatus of this embodiment is the same as the first embodiment.

In this embodiment, a subfield border detector 48 is provided in place of a gradation detector 40. Furthermore, seven subfield tables 46*a*, 46*b*, 46*c*, 46*d*, 46*e*, 46*f* and 46*g*, which receive an output from the multiplier 12, are connected to the subfield border detector 48.

In this embodiment, subfield table 46*a* contains Table 7 and eight subfield memories. Subfield table 46*b* contains Table 8 and nine subfield memories. Subfield table 46*c* contains Table 9 and ten subfield memories. Subfield Table 46*d* contains Table 10 and eleven subfield memories. Subfield table 46*e* contains Table 11 and twelve subfield memories. Subfield table 46*f* contains Table 12 and thirteen subfield memories. Subfield table 46*g* contains Table 13 and fourteen subfield memories.

When upper 8 bits of brightness signal for one pixel is sent simultaneously from the multiplier 12 to subfield tables 46a, 46b, 46c, 46d, 46e, 46f and 46g, in subfield table 46a, the 8 bits are stored respectively in corresponding locations of 8 subfield memories.

Subfield table 46b converts the 8-bit signal to a 9-bit signal using Table 8, and stores the 9 bits respectively in corresponding locations of 9 subfield memories. Subfield table 46c converts the 8-bit signal to a 10-bit signal using Table 9, and stores the 10 bits respectively in corresponding locations of 10 subfield memories. Subfield table 46d converts the 8-bit signal to an 11-bit signal using Table 10, and stores the 11 bits respectively in corresponding locations of 11 subfield memories. Subfield table 46e converts the 8-bit signal to a 12-bit signal using Table 11, and stores the 12 bits respectively in corresponding, locations of 12 subfield memories. Subfield table 46f converts the 8-bit signal to a 13-bit signal using Table 12, and stores the 13 bits respectively in corresponding locations of 13 subfield memories. Subfield table 46g converts the 8-bit signal to a bit signal using Table 13, and stores the 14 bits respectively in corresponding locations of 14 subfield memories.

Using information from table 46a or data from the 8 subfield memories, the subfield border detector 48 numerically indicates an extent to which pseudo-contour lines will appear in a border part where brightness changes. For example, in case of a border part where brightness levels are 127 and 128, a 255 level of pseudo-contour noise will emerge, and hence the extent to which pseudo-contour lines will appear in such a part can be indicated as 255. After determining such values for entire one screen, a value obtained by totaling these values is used as a border evaluating value Ba which represents the extent of pseudo-contour lines appearance. Similarly, other border evaluating values for one screen Bb, Bc, Bd, Be, Bf and Bg obtained from other tables 46b–46g are calculated at the same time. Therefore, seven border evaluating values Ba–Bg are outputted from the subfield border detector 48.

The motion detector 42 outputs a motion signal Mv similar to the first embodiment. The pseudo-contour determining device 44 generates seven pseudo-contour measuring values MPDr by multiplying a motion signal by each of the border evaluating values Ba through Bg. The most ideal one of the seven values is selected, that is, the minimum pseudo-contour measuring value MPDr is selected, and then four parameters are selected based on the selected value MPDr. The processing of the four parameters is performed the same as described above.

In accordance with this embodiment, it becomes possible to create an optimum image, since a pseudo-contour noise measuring value is utilized.

(Fourth Embodiment)

Figure 19:
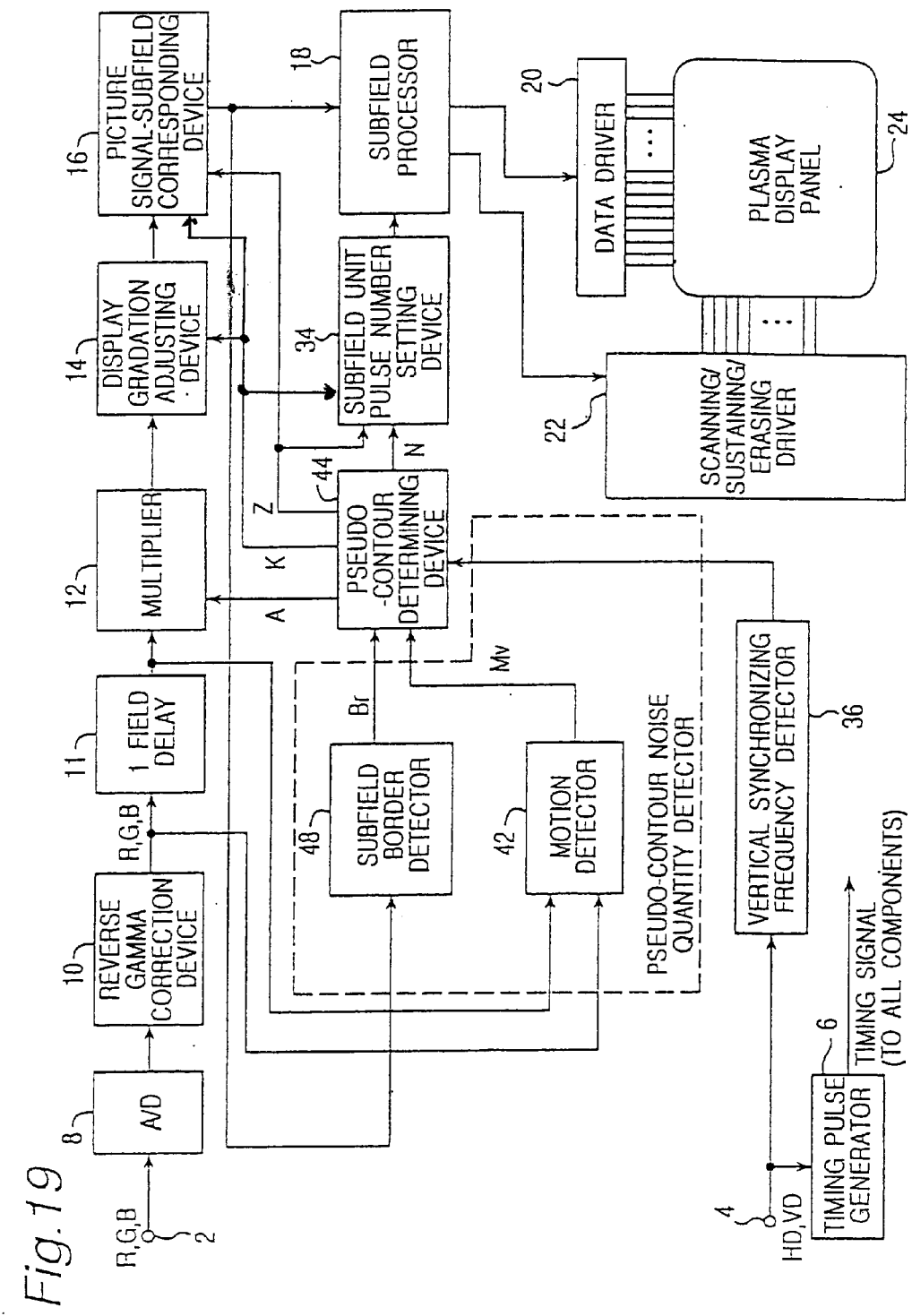
FIG. 19 shows a block diagram of a display apparatus of a fourth embodiment.

FIG. 19 shows a block diagram of a display apparatus of a fourth embodiment. In the third embodiment (FIG. 18), a signal from the multiplier 12 was inputted to subfield tables 46a through 46g. On the contrary, in this embodiment, the subfield border detector 48 directly receives an output signal from the picture signal-subfield corresponding device 16.

The subfield border detector 48 receives an image signal, in which a multiplication factor A, a number of subfields Z, and a number of gradation display points K have been established. That is, an image signal, for which pseudo-contour noise is tentatively believed to have been reduced, is fed back to the subfield border detector 48. The subfield border detector 48 outputs a border evaluating value Br for actual picture image with at least one field delay. The pseudo-contour determining device 44 generates a pseudo-contour measuring value MPDr for the actual picture image with at least one field delay. Thereafter, four parameters are selected in a similar way described above.

In this embodiment, a pseudo-contour measuring value MPDr is generated based on an actual picture image even with one field delay, and hence an optimum image can be achieved. Further, the subfield tables 46a through 46g used in the third embodiment are not necessary, therefore costs can be reduced.

(Fifth Embodiment)

Figure 20:
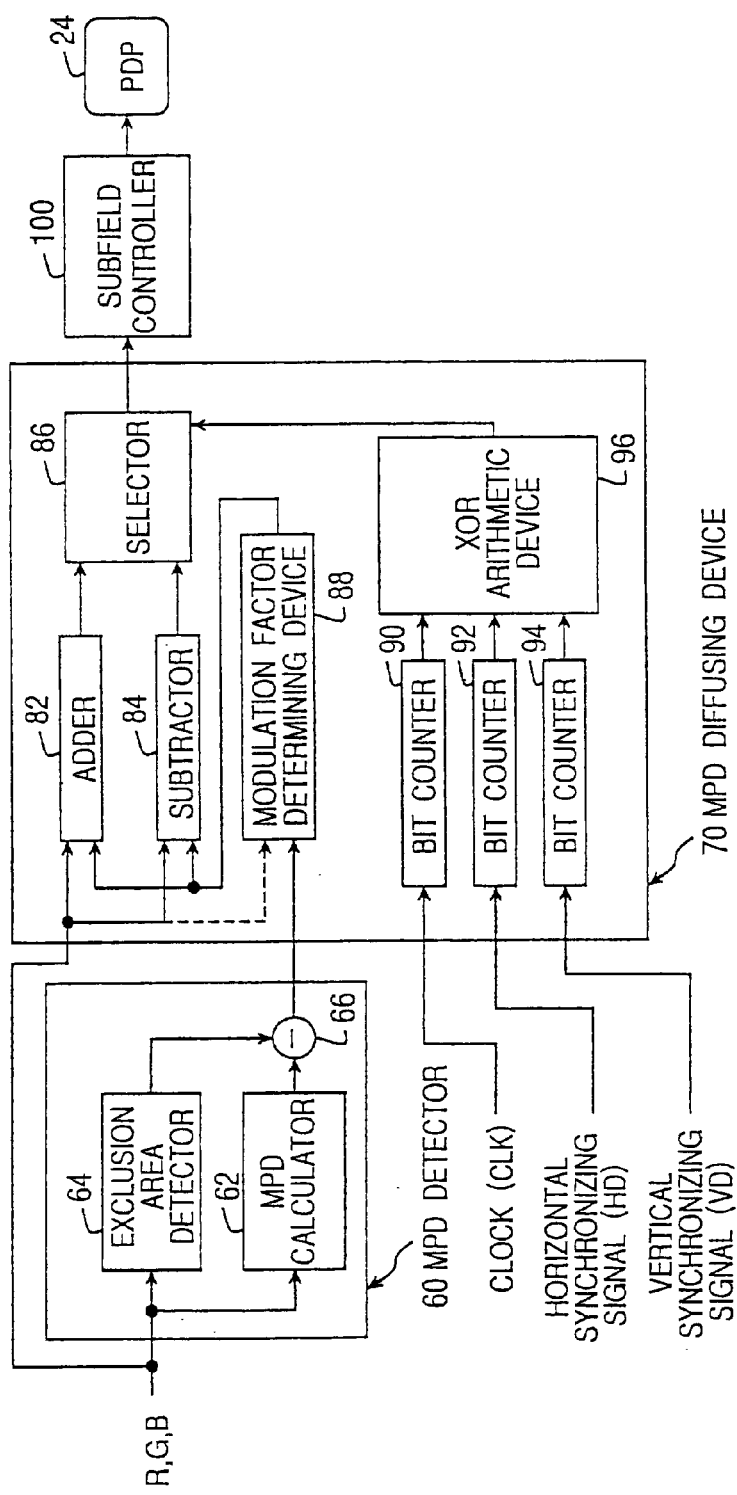
FIG. 20 shows a block diagram of a display apparatus of a fifth embodiment.

FIG. 20 shows a block diagram of a display apparatus of a fifth embodiment. The display apparatus of this embodiment expects the appearance of pseudo-contour noise (or MPD: Motion Picture Distortion) in an image, and performs diffusion processing to reduce pseudo-contour noise for an image area in which the appearance of pseudo-contour noise is expected. As shown in this figure, the display apparatus comprises an MPD detector 60, an MPD diffusing device 70, a subfield controller 100 and a plasma display panel (PDP) 24.

The MPD detector 60 inputs an image in each 1 frame, and expects the appearance of pseudo-contour noise in the input image. To make this expectation, the MPD detector 60 divides the input image into a predetermined number of blocks of pixels, and detects the quantity of pseudo-contour noise (hereinafter this quantity is referred to as the "MPD value"), which indicates a pseudo-contour noise capable of appearing in each of these blocks, or in each pixel. The larger this MPD value is, the more readily pseudo-contour noise will appear.

The MPD diffusing device 70 performs processing for reducing the appearance of pseudo-contour noise (hereinafter this process is referred to as "MPD diffusion processing") on the basis of the expectation results (MPD value) by the MPD detector 60.

The subfield controller 100 receives an image signal from the previous stage, that is MPD diffusing device 70, converts it to a predetermined subfield signal, and controls the plasma display panel 24 for display of an image based on the image signal. The subfield controller 100 comprises the display gradation adjusting device 14, the picture signal-subfield corresponding device 16, and the subfield processor 18 shown in the previous embodiments.

The display apparatus thus comprised determines the quantity of pseudo-contour noise (MPD value) for the input image by the MPD detector 60, and performs MPD diffusion processing by the MPD diffusing device 70 in order to reduce pseudo-contour noise only for an image area in which the pseudo-contour noise is expected to appear based on the determined MPD value. Thereafter, the display apparatus converts the image signal for which the appearance of pseudo-contour noise has been suppressed into a subfield signal by the subfield controller 100, and displays it on the plasma display panel 24.

Configuration and operation of the MPD detector 60 and the MPD diffusing device 70 are described in detail below.

Figure 21:
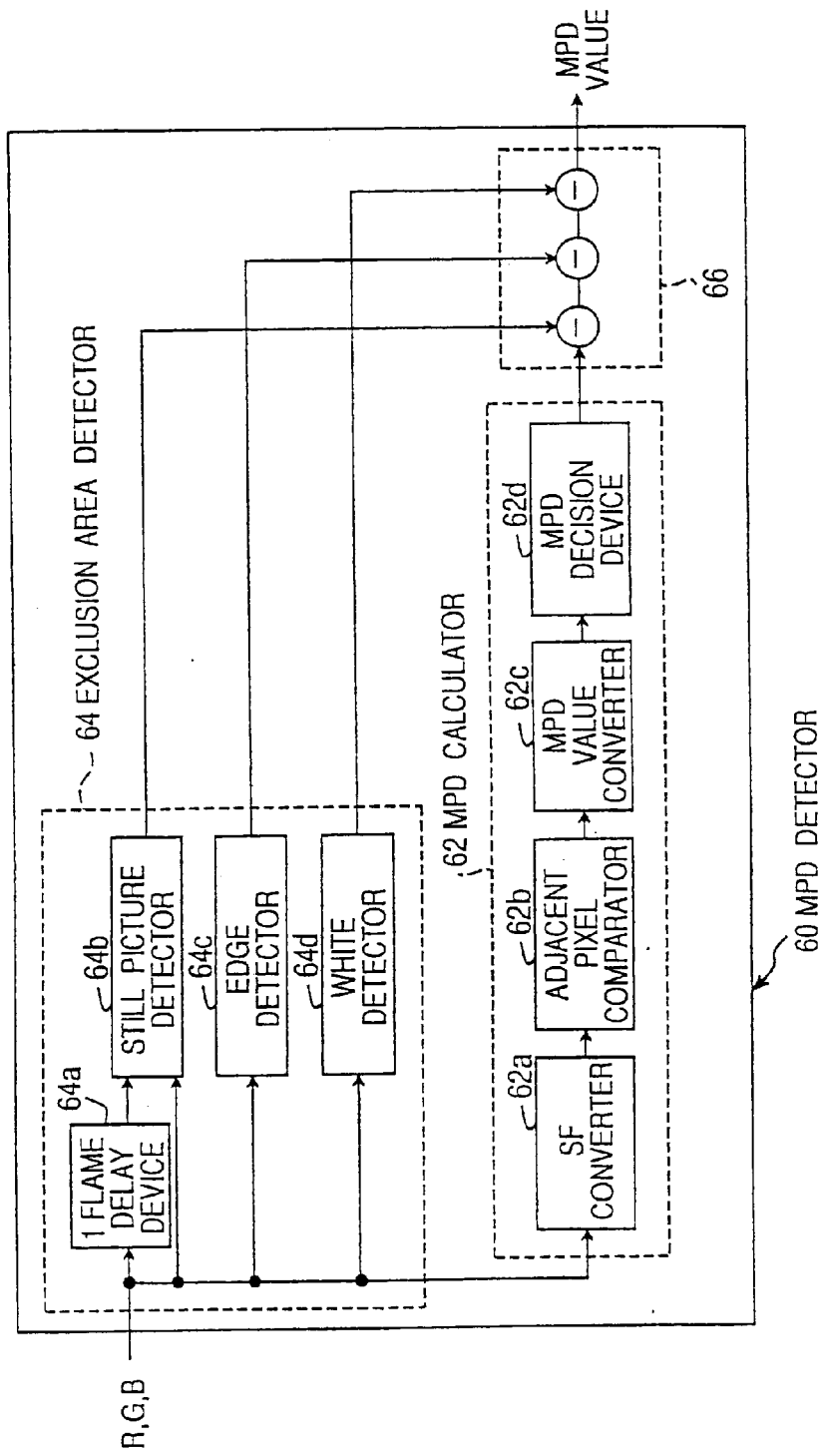
FIG. 21 shows a block diagram of an MPD detector in the fifth embodiment.

FIG. 21 shows a block diagram of an MPD detector 60. The MPD detector 60 comprises an MPD calculator 62 to calculate an MPD value which is a pseudo-contour noise quantity, an exclusion area detector 64 to detect an area of the input image area, in which pseudo-contour noise reduction need not be performed, and a subtractor 66 to excludes an area detected by the exclusion area detector 64 from an image area for which an MPD value has been determined by the MPD detector 60.

The MPD calculator 62 comprises a subfield converter 62a, an adjacent pixel comparator 62b, an MPD value converter 62c and an MPD decision device 62d.

A subfield converter 62a is similar to the subfield conversion table 46 shown in FIG. 18, and converts the luminance of each pixel of an input image to a signal for achieving correspondence with predetermined subfields. For example, when employing subfields SF1 to SF8 with respective weights of 1, 2, 4, 8, 16, 32, 64, 128, the subfield 62a corresponds the luminance to an 8-bit signal. In the 8-bit signal, the first bit corresponds to SF8 with a weight of 128, the second bit corresponds to SF7 with a weight of 64, the third bit corresponds to SF6 with a weight of 32, the fourth bit corresponds to SF5 with a weight of 16, the fifth bit corresponds to SF4 with a weight of 8, the sixth bit corresponds to SF3 with a weight of 4, the seventh bit corresponds to SF2 with a weight of 2, and the eighth bit corresponds to SF1 with a weight of 1. In accordance with this, for example, the value of a pixel with a luminance of 127 is converted to the 8-bit signal (0111 1111).

Figure 22:
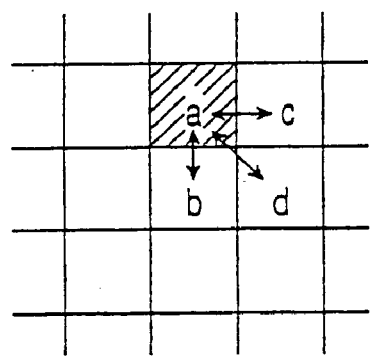
FIG. 22 shows a diagram showing adjacent pixels subjected to a logical operation.

The adjacent pixel comparator 62b compares the value of a pixel with that of adjacent pixels in vertical, horizontal and diagonal directions, for each pixel in every subfield. That is, it compares the value of a certain pixel with the value of a pixel adjacent to the certain pixel, and detects a pixel whose value differs therefrom. For example, as shown in FIG. 22, it compares the value (luminance) of pixel a with that of vertically-adjacent pixel b, horizontally-adjacent pixel c, and diagonally-adjacent pixel d. In general, pseudo-contour noise will easily appear when the light emissions of adjacent pixels alternate. Therefore in this embodiment, the probability of pseudo-contour noise appearance is expected by finding a pixel whose value differs from that of adjacent pixels. The adjacent pixel comparator 62b in this embodiment performs pixel value comparison by carrying out an exclusive-OR (XOR) operation between pixels.

The MPD value converter 62c converts an 8-bit signal obtained via an XOR operation by the adjacent pixel comparator 62b to a value obtained by taking the weight of a subfield into consideration (hereinafter this conversion is referred to as "reverse subfield conversion"). That is, value is calculated for each bit in an 8-bit signal with a weight corresponding to each subfield. Then a MPD value is obtained by sum of the values obtained in the above manner for all bits. Reverse subfield conversion is performed in this manner so as to enable the MPD value ultimately obtained to be constantly evaluated with the same basis without relying on a combination of subfields. For example, this is so the same MPD value can be obtained when using subfields with weight (1, 2, 4, 8, 16, 32, 64, 128) as when using subfields with weight (1, 2, 4, 8, 16, 32, 64, 64, 64).

Thereafter, the MPD decision device 62d consolidates the MPD values determined by the adjacent pixel comparator 62b for each pixel in each direction. Then, the MPD decision device 62d determines whether or not MPD diffusion processing should be performed for a block area with a predetermined size based on the MPD value of the block area.

The above-mentioned operation of the MPD calculator 62 is described below using specific examples. Now, consider a situation in which a pixel with a luminance of 6 is adjacent to a pixel with a luminance of 7, as shown in FIG. 23A.

First, the subfield converter 62a performs subfield conversion on these pixels. The pixel with a luminance of 6 is converted to a subfield (0000 0110), and the pixel with a luminance of 7 is converted to a subfield (0000 0111). It should be noted that in FIG. 23A subfields SF5 through SF8 which correspond to upper bits are omitted, and only subfields SF1 through SF4 which correspond to lower bits are shown. Further, the hatched portion in the figure indicates a subfield, the bit for which is "1."

Next, the adjacent pixel comparator 62b calculates an XOR (exclusive "or") of these pixels in each subfield. This XOR operations results in (0000 0001). This XOR operation result (0000 0001) provides 1 (=1×1) as a result of the reverse subfield conversion in the MPD value converter 62c. This value is used as the pixel MPD value.

Figure 23:
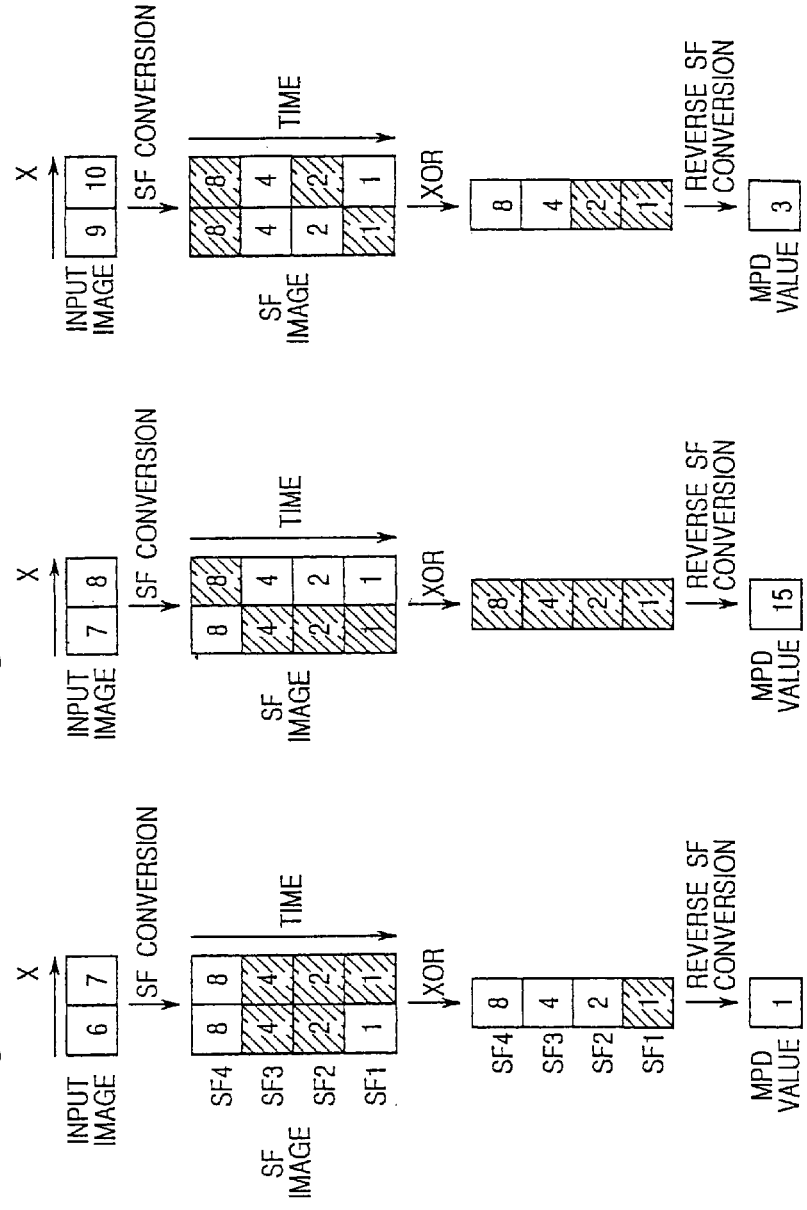
FIGS. 23A–23C show diagrams illustrating specific examples of subfield (SF) conversion, pixel comparison using XOR operation, and reverse subfield conversion.

Similarly, as shown in FIG. 23B, when a pixel with a luminance of 7 is adjacent to a pixel with a luminance of 8, the values produced by subfield conversion of the luminance 7 pixel and luminance 8 pixel work out to (0000 0111), (0000 1000), respectively, and the XOR operation result is (0000 1111). Subjecting this to reverse subfield conversion produces a value of 15 (=8×1+4×1+2×1+1×1).

Similarly, as shown in FIG. 23C, when a pixel with a luminance of 9 is adjacent to a pixel with a luminance of 10, the values produced by subfield conversion of the luminance 9 pixel and luminance 10 pixel work out to (0000 1001), (0000 1010), respectively, and the XOR operation result is (0000 0011). Subjecting this to reverse subfield conversion produces a value of 3 (=2×1+1×1).

Furthermore, in the above-described adjacent pixel comparator 62b, comparison between pixels was performed with an XOR operation, but other logical operations can be used besides this, for example, AND operation, OR operation and so on. In this case, the difference between an AND operation result and the original pixel value, and the difference between an OR operation result and the original pixel value are each calculated, and either the average value, or larger one of these differences is obtained as the MPD value of the pixel. Or either of these differences may be utilized as the MPD value.

Further, the above mentioned examples, in which pixel comparison is performed between a certain pixel (pixel of interest) and a pixel adjacent thereto, but pixel comparison is not limited to this, but rather can be performed for a pixel of interest and peripheral pixels to the pixel of interest, that is a pixel that is 2 or more pixels away from the pixel of interest in a certain direction. For example, when pixel comparison is performed for a pixel that is located within 3 pixels of a pixel of interest in a certain direction, logical operations is performed between the pixel of interest and a plurality of successive pixels located at various distances from the pixel of interest respectively, then the value obtained by adding the results thereof can be treated as the MPD value in that direction. At this time, the addition may be performed after weighting the logic operation results for pixels located at various distances with weights according to distance from the pixel of interest. Determining an MPD value by performing pixel comparison between a pixel of interest and peripheral pixels in this manner is advantageous particularly to an image moving at a high velocity.

Figure 24:
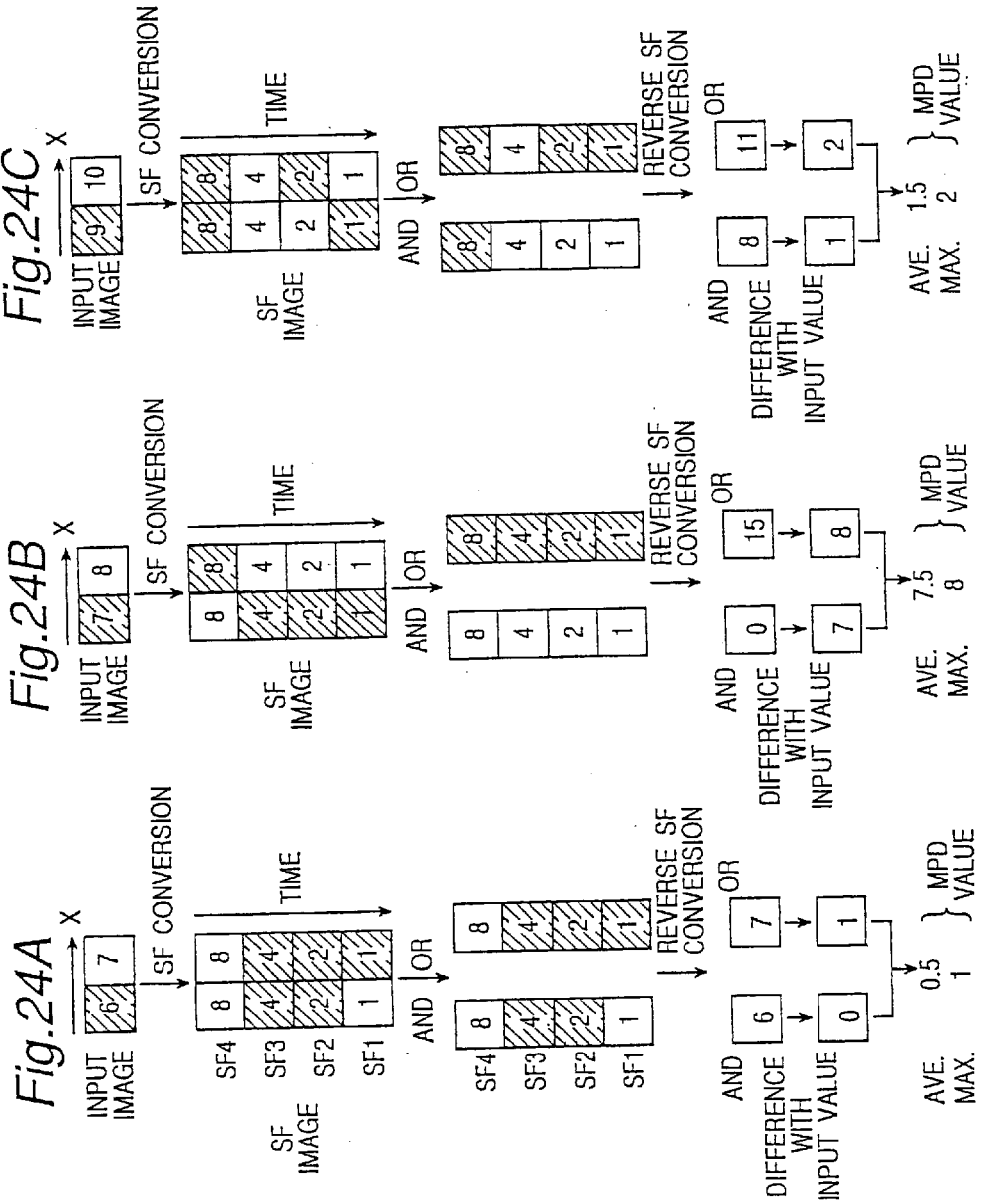
FIGS. 24A–24C show diagrams illustrating specific examples of subfield (SF) conversion, pixel comparison using AND, OR operation, and reverse subfield conversion.

FIGS. 24A, 24B and 24C shows a specific example of when pixel comparison is performed using AND operation and OR operation. FIG. 24A shows an example in which MPD value is calculated by using AND, OR operations when a pixel with a luminance of 6 is adjacent to a pixel with a luminance of 7. At this time, the AND operation result, and OR operation result following reverse subfield conversion worked out to 6, 7 respectively, and the differences with the original (input) pixel value (here, the pixel with a luminance of 6 is treated as the original pixel) work out to 0, 1, respectively. Therefore, the MPD value is set at either 0.5 which is the average value thereof, or 1 which is the largest (maximum) value. Similarly, as shown in FIG. 24B, the AND operation result and OR operation result obtained after the reverse subfield conversion for a pixel with a luminance of 7 and a pixel with a luminance of 8 work out to 0, 15 respectively, and the differences with the original pixel value (the pixel with a luminance of 7) work out to 7, 8, respectively. Therefore, the MPD value is set at either 7.5 as the average value, or 8 as the largest value. Similarly, as shown in FIG. 24C, the AND operation result and OR operation result obtained after reverse subfield conversion for a pixel with a luminance of 9 and a pixel with a luminance of 10 work out to 8, 11, respectively, and the differences with the original pixel value (the pixel with a luminance of 9) work out to 1, 2, respectively. Therefore, the MPD value is set at either 1.5 as the average value, or 2 as the largest value.

Figure 25:
FIGS. 25A–25E show Diagrams for explaining the operation of an MPD decision device.

The adjacent pixel comparator 62b performs logical operations on each pixel using procedures such as those described above. At this time, the adjacent pixel comparator 62b determines an MPD value between adjacent pixels in each of vertical, horizontal and diagonal direction, as shown in FIGS. 25B, 25C and 25D.

Furthermore, in the above examples, an 8-bit signal determined by the adjacent pixel comparator 62b was converted to a weighted value determined by the MPD value converter 62c, and this value was treated as the MPD value. But, the MPD value may be the number obtained by counting bits having a value of "1" of all the bits in the 8-bit signal determined by the adjacent pixel comparator 62b. For example, when the 8-bit signal from the adjacent pixel comparator 62b is (0110 0011), the MPD value can be set at 4.

After an MPD value has been determined, the MPD decision device 62d determines whether or not pixels in each predetermined-size block should be performed with MPD diffusion processing. To do this, the MPD decision device 62d, first, performs an XOR operation in each of the vertical, horizontal and diagonal directions for an MPD value between adjacent pixels determined as described above. For example, when a pixel value in a predetermined area of an input image is as shown in FIG. 25A, MPD values calculated in a vertical direction, a horizontal direction and a diagonal direction, respectively, are shown in FIG. 25B, FIG. 25C and FIG. 25D. It is noted that 1 block is a 4×4 pixel size in FIGS. 25A to 25E. Next, the MPD decision device 62d determines logical add (OR operation) (as shown in FIG. 25E) for the value calculated in a vertical direction (as shown in FIG. 25B), the value calculated in a horizontal direction (as shown in FIG. 25C), and the value calculated in a diagonal direction (as shown in FIG. 25D), for each pixel within a block.

The MPD decision device 62d refers to the result (FIG. 24E) of the logical add in each direction, and determines the number of pixels, of which the pixel value (logical add of MPD value in each direction) is equal to or higher than a first predetermined value. Next, it determines whether or not the determined number is equal to higher than a second predetermined value. When the number of pixels that is equal to higher than a first predetermined value, is equal to or higher than a second predetermined value, this block is judged to be an area in which MPD diffusion processing is to be performed, and the MPD value of each pixel is held. Conversely, when the number of pixels that is equal to or higher than a first predetermined value, is lower than a second predetermined value, this block is judged not to be an area in which MPD diffusion processing is to be performed, and the MPD value of each pixel inside this block is set to 0.

For example, when a first predetermined value is 5, and a second predetermined value is 4, in the case of FIGS. 25A to 25E, the number of pixels, which is equal to or higher than the first predetermined value comes to 6, and this value is equal to or higher than the second prescribed value. Hence, this block is targeted for MPD diffusion processing.

In this manner, the MPD decision device 62d performs processing for an entire image to determine whether or not each block of a predetermined size will become the target of MPD diffusion processing. Furthermore, the MPD values of pixels inside a block may be summed. When the sum total is higher than a predetermined value, the block area can be judged as being a target for MPD diffusion processing. Further, processing by this MPD decision device 62d can be carried out for every pixel instead of every block. For example, after determining the logical add of the MPD value in each direction for each pixel, determination processing can be performed by comparing the value thereof with the first predetermined value. This signifies that the MPD decision device 62d outputs an MPD value calculated for each pixel.

Further, the MPD decision device 62d can determine the MPD value for an entire screen by totaling the MPD values obtained for each block over the entire screen, and output the determined MPD value. Or, the MPD decision device 62d can count blocks in a screen, which have the MPD value beyond a predetermined value, and output this counted number as the MPD value for the entire screen. Gradation display control described in previous embodiments can be performed by using the MPD value of an entire screen determined in this manner.

As described above, the MPD calculator 62 calculates a pseudo-contour noise quantity (MPD value) which indicates the probability of appearance of pseudo-contour in each block of a prescribed size, or in each pixel, by comparing the pixel value (luminance) between adjacent pixels for the input image.

The exclusion area detector 64 in the MPD detector 60 is described below. The exclusion area detector 64 detects an area within the input image, in which pseudo-contour noise detection is not performed. More specifically, the exclusion area detector 64 detects a still picture area, edge area and white area in the input image. The reason for excluding the still picture area is because pseudo-contour noise is basically generated in a motion picture, and pseudo-contour noise is not readily generated in a still picture area. Further, the reason for excluding the edge area is because an edge area is not readily affected by pseudo-contour noise, and performing MPD diffusion processing actually reduces resolution of the edge area. Further, the white area is excluded because the white area is not readily affected by pseudo-contour noise.

As shown in FIG. 21, the exclusion area detector 64 comprises a 1 frame delay device 64a, a still picture detector 64b, an edge detector 64c and a white detector 64d.

The still picture detector 64b compares an image delayed by one frame from the 1 frame delay device 64a, with an image that does not pass through the 1 frame delay device 64a, and detects a still picture area by detecting a change in those images.

The white detector 64d detects a white area in an image by determining whether or not the signal levels of each R, G, B signal of each pixel are all higher than a predetermined level.

The edge detector 64c detects an edge area of the image as described below. That is, it determines the difference in luminance (absolute value) between a certain pixel and a pixel adjacent thereto in each of a vertical, a horizontal and a diagonal directions. For example, for the input image (original image) shown in FIG. 26A, it determines the luminance difference between adjacent pixels in each of the vertical, horizontal, diagonal and directions respectively, as shown in FIGS. 26B, 26C and 26D. Next, the edge detector

Figure 26:
FIGS. 26A–26E show Diagrams for explaining the operation of an edge detector.

64c takes the maximum value among the differences determined for each pixel in each direction (result is shown in FIG. 26E). Thereafter, it determines, inside a block with a predetermined size, the number of pixels, for which the value of each pixel is equal to or higher than a third predetermined value. Next, it determines whether or not the determined number of pixels is equal to or higher than a fourth determined value. When the determined number is equal to or higher than the fourth determined value, that area is treated as the edge area. For example, in the case of FIG. 26, when the third predetermined value is 4 and the fourth predetermined value is 4, the block (4×4 pixel area) shown in FIG. 26E becomes the edge area.

As described above, the exclusion area detector 64 detects in each block areas in which pseudo-contour noise detection is not performed in an image, that is, the still picture area, the edge area and the white area.

Thereafter, the subtractor 66 subtracts the exclusion area detected by the exclusion area detector 64 from an area where MPD values is determined by the MPD calculator 62. That is, the subtractor 66 sets to zero the MPD values of pixels in the exclusion area detected by the exclusion area detector 64, such as still picture area, the edge area and the white area.

The MPD detector 60 outputs as a final MPD value the MPD value determined by the MPD calculator 62 and exclusion area detector 64 in the above mentioned manner. It is noted that the functions of the MPD detector 60 described above are the same as the functions achieved by combination of the pseudo-contour determining device, and pseudo-contour detector or pseudo-contour noise quantity outputting device in the previous embodiments.

The MPD diffusing device 70 is described next. In general, when displaying a certain luminance, it is well known that by alternately displaying a luminance that is higher by a predetermined value than the certain luminance, or a luminance that is lower by a predetermined value than the certain luminance, the luminance is temporally equalized, and can be seen by the human eye just as if it is the certain luminance being displayed. For example, when a luminance of 8 (=10−2) is alternately displayed with a luminance of 12 (=10+2), the human eye takes the average thereof, and sees it as a luminance of 10 being displayed. That is, as shown in FIG. 27, by continuously displaying the luminance indicated by the thick solid line (upper) together and the luminance indicated by the thin solid line (lower), the values thereof are equalized, and it appears as though the luminance indicated by the broken line is being displayed.

In this embodiment, the MPD diffusing device 70 makes use of the above-described characteristic of human eyes, and thereby performs the MPD diffusion processing by controlling gradation of the input image displayed on the PDP 24 in a predetermined manner. In other words, when displaying each pixel with a luminance, this display apparatus continuously displays a luminance which adds, and a luminance which subtracts a predetermined changing quantity relative to an original luminance. At this time, the addition and subtraction of the changing quantity is inverted between adjacent pixels to the top, bottom, left, right. That is, when a changing quantity is added to a certain pixel, a changing quantity is subtracted from pixels situated adjacent to the top, bottom, left, right thereof. Conversely, when a changing quantity is subtracted from a certain pixel, a changing quantity is added to pixels situated adjacent to the top, bottom, left, right thereof. In accordance with this, the appearance of pseudo-contour noise (MPD) can be reduced without losing the original luminance, because a pixel luminance changes from the original luminance and therefore a subfield pattern of adjacent pixels in that area changes.

More specifically, MPD diffusion is performed using the MPD diffusion patterns shown in FIG. 28. Referring to the patterns shown in this figure, the MPD diffusing device 70 decides whether to add or subtract a changing quantity (hereinafter referred to as a "diffusion factor") relative to a certain pixel. In the figure, the "+" sign indicates the addition of a diffusion factor to an original luminance, and the "−" sign indicates subtraction. As shown in the figure, "+," and "−" are alternated in each adjacent pixel in each row, and in each adjacent row. Further, the left pattern in FIG. 28 is an MPD diffusion pattern for a certain field, and the right one is an MPD diffusion pattern for a next field. These patterns are temporally alternated in succession. Therefore, the luminance of pixels in the same location is temporally equalized by being displayed using these two patterns, achieving an original luminance.

Turning to FIG. 20, the constitution of the MPD diffusing device 70 is described. The MPD diffusing device 70 comprises an adder 82, a subtractor 84, a selector 86, a modulation factor determining device 88, bit counters 90, 92, 94, and an XOR arithmetic device 96.

Figure 29:
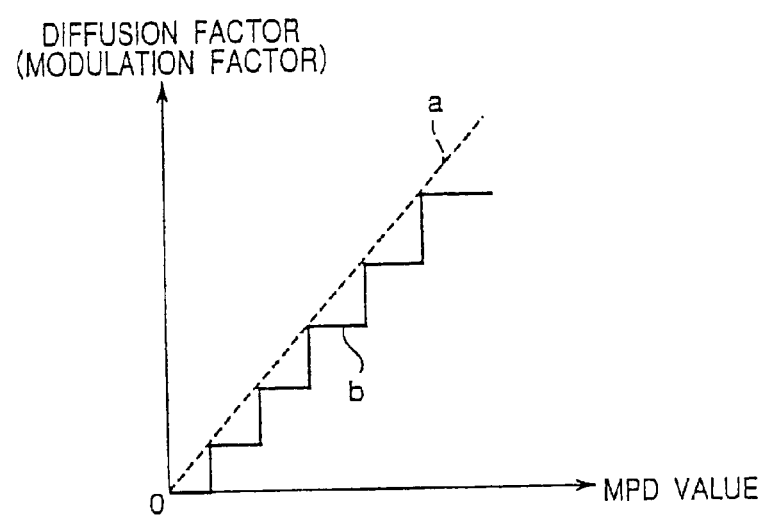
FIG. 29 shows a diagram showing a specific example of the relationship of modulation factor (change quantity) to MPD value.

A modulation factor determining device 88 determines the diffusion factor for each pixel based on the MPD value determined by the MPD detector 60. Furthermore, since adding and subtracting a diffusion factor to an original image using an MPD diffusion pattern such as that described above is a kind of modulation, hence "diffusion factor" is also called "modulation factor". That is, the modulation factor determining device 88 determines the modulation factor so that the larger the MPD value, the greater the degree of modulation thereof. In this manner, the effect of diffusion is enhanced by increasing the size of an added or subtracted diffusion factor as the MPD value is larger. In this case, the modulation factor determining device 88 can change a diffusion factor (modulation factor) in proportion to an MPD value, linearly as indicated by the broken line a in FIG. 29, or stepwise as indicated by the solid line b. Further, the modulation factor determining device 88 can change a diffusion factor (modulation factor) on the basis of pixel luminance. In this case, the modulation factor is increased as the pixel luminance is larger.

The adder 82 modulates an original image signal by adding to each pixel a diffusion factor determined by the modulation factor determining device 88 and outputting the results thereof. The subtractor 84 modulates an original image signal by subtracting from each pixel a diffusion factor determined by the modulation factor determining device 88 and outputting the results thereof.

The bit counters 90, 92, 94 and XOR arithmetic device 96 constitute means for generating the MPD diffusion patterns shown in FIG. 28. That is, a clock CLK, horizontal synchronization signal HD, vertical synchronization signal VD, respectively, are counted by bit counters 90, 92 and 94. The results of the counting thereof are input to the XOR arithmetic device 96. The XOR arithmetic device 96 computes an exclusive logical add of the result counted by each bit counter 90, 92 and 94. As a result, a selection signal which has a checkered MPD diffusion pattern as shown in FIG. 28, is generated.

The selector 86 selects and outputs for each pixel an image signal from either the adder 82 or the subtractor 84 based on the selection signal from the XOR arithmetic device 96. At this time, an image in which the degree of diffusion is changed in accordance with an MPD value, is output by the selector 86. However, in case where the increase or decrease of modulation in each pixel for an entire screen is changed using a pattern such as that shown in FIG. 28, there is the problem that it gives rise to a rough surface and degradation of picture quality over the entire screen when the diffusion factor (modulation factor) is large. But with this embodiment, this kind of degradation of picture quality over an entire screen can be prevented, since diffusion processing is only implemented in an area where the appearance of pseudo-contour noise has been expected.

Furthermore, the MPD diffusing device 70 is not limited to diffusion processing which controls gradation of displayed image as described above, but rather, other modulation processing or other diffusion processing can be performed as long as it is capable of reducing the appearance of pseudo-contour noise.

As described above, the display apparatus of this embodiment numerically determines as a pseudo-contour noise quantity (MPD value) the probability of the appearance of pseudo-contour noise relative to an image. At this time, the display apparatus determines an MPD value by excluding areas in which pseudo-contour noise is not expected to occur such as a still picture area. Thereafter, the display apparatus implements MPD diffusion processing for reducing the appearance of pseudo-contour noise based on the determined MPD value by changing the degree of diffusion in accordance with the pseudo-contour noise quantity only in an area in which there is a probability of appearance of the noise.

Thus, the display apparatus expects the appearance of pseudo-contour noise, and processes an image signal so as to reduce the appearance of pseudo-contour noise when there is a probability that pseudo-contour noise will occur. The display apparatus thereby can suppress the appearance of pseudo-contour noise and can improve the quality of a display image of a plasma display. At this time, since the display apparatus implements MPD diffusion processing only for an image area in which pseudo-contour noise is expected to occur, it can prevent image degradation in an area in which pseudo-contour noise is not expected to occur resulting from MPD diffusion processing. Furthermore, MPD diffusion processing can be implemented more optimally in accordance with the magnitude of pseudo-contour noise, since the intensity of MPD diffusion is changed in accordance with the magnitude of the expected pseudo-contour noise.

Although the present invention has been described in connection with specified embodiments thereof, many other modifications, corrections and applications are apparent to those skilled in the art. Therefore, the present invention is not limited by the disclosure provided herein but limited only to the scope of the appended claims.

What is claimed is:

1. A pseudo-contour noise detecting device for detecting pseudo-contour noise, the pseudo-contour noise embodied as contour lines appearing spuriously in a motion picture displayed such that a gradation display is performed by using a plurality of weighted subfields into which one field of an input image is divided, the input image including a plurality of pixels, the device comprising a pseudo-contour noise calculating unit, the unit including:
   a system that performs a logic operation, for each subfield, on each pixel of at least a portion of the input image using a value of the each pixel and values of at least one of pixels surrounding the each pixel; and
   a system that calculates a value corresponding to an amount of pseudo-contour noise according to a number of subfields in which a difference is detected between the value of the each pixel and the values of the at least one pixels surrounding the each pixel.

2. The pseudo-contour noise detecting device according to claim 1, wherein, when the input image is divided into a plurality of areas of a predetermined size, the pseudo-contour noise calculating unit calculates the pseudo-contour noise for each divided area.

3. The pseudo-contour noise detecting device according to claim 1, further comprising an exclusion area detector that detects an area of the input image in which the pseudo-contour noise is not expected to occur,
   wherein the pseudo-contour noise calculating unit calculates the pseudo-contour noise in an area of the input image, with the exception of the area detected by the exclusion area detector.

4. The pseudo-contour noise detecting device according to claim 3, wherein the area in which the pseudo-contour noise is not expected to occur includes, at least one of an edge area, a still image area and a white area.

5. The pseudo-contour noise detecting device according to claim 1, wherein the at least a portion of the input image is an entire input image.

6. A display device that divides an image in one field into a plurality of subfields, and that performs a gradation display using the plurality of subfields, the display device comprising:
   a pseudo-contour noise detecting device according to claim 1; and
   a pseudo-contour noise reducing unit that reduces the pseudo-contour noise based on the amount of the pseudo-contour noise calculated by the pseudo-contour noise detecting device.

7. A display device that divides an image in one field into a plurality of subfields, and that performs a gradation display using the plurality of subfields, the display device comprising:
   a pseudo-contour noise detecting device according to claim 3; and
   a pseudo-contour noise reducing unit that reduces the pseudo-contour noise based on the amount of the pseudo-contour noise calculated by the pseudo-contour noise detecting device.

8. A display device that divides an image in one field into a plurality of subfields, and that performs a gradation display using the plurality of subfields, the display device comprising:
   a pseudo-contour noise detecting device according to claim 3; and
   a pseudo-contour noise reducing unit that reduces the pseudo-contour noise based on the amount of the pseudo-contour noise calculated by the pseudo-contour noise detecting device.

9. A display device that divides an image in one field into a plurality of subfields, and that performs a gradation display using the plurality of subfields, the display device comprising:
   a pseudo-contour noise detecting device according to claim 4; and
   a pseudo-contour noise reducing unit that reduces the pseudo-contour noise based on the amount of the pseudo-contour noise calculated by the pseudo-contour noise detecting device.

10. A display device that divides an image in one field into a plurality of subfields, and that performs gradation display using the plurality of subfields, the display device comprising:

a pseudo-contour noise detecting device according to claim 5; and a pseudo-contour noise reducing unit that reduces that pseudo-contour noise based on the amount of the pseudo-contour noise calculated by the pseudo-contour noise detecting device.

11. A method for detecting pseudo-contour noise appearing spuriously in a motion picture displayed such that a gradation display is performed by using a plurality of weighted subfields into which one field of an input image is divided, the input image including a plurality of pixels, the method comprising:

performing a logic operation, for each subfield, on each pixel of at least a portion of the input image using a value of the each pixel and values of at least one of the pixels surrounding each pixel;

calculating a value corresponding to an amount of pseudo-contour noise according to a number of subfields in which a difference is detected between the value of the each pixel and the values of at least one of the pixels surrounding the each pixel.

12. The method according to claim 11, wherein, when the input image is divided into a plurality of areas of a predetermined size, the performing, the calculating are performed for each divided area.

13. The method according to claim 11, further comprising detecting an exclusion area of the input image, in which the pseudo-contour noise is not expected to occur, wherein the performing and the calculating are performed in an area of the input image, with the exception of the detected exclusion area.

14. The method according to claim 13, wherein the detecting detects at least one of an edge area, a still image area and a white area, as the area in which the pseudo-contour noise is not expected to occur.

15. The method according to claim 11, wherein the at least a portion of the input image is an entire input image.

16. A method for controlling a display device that divides an image in one field into a plurality of subfields, and that performs a gradation display using the plurality of subfields, the method comprising:

calculating the amount of pseudo-contour noise according to the method of claim 11; and reducing the pseudo-contour noise based on the calculated amount of the pseudo-contour noise.

17. A method for controlling a display device that divides an image in one field into a plurality of subfields, and that performs a gradation display using the plurality of subfields, the method comprising:

calculating the amount of pseudo-contour noise according to the method of claim 12; and reducing the pseudo-contour noise based on the calculated amount of the pseudo-contour noise.

18. A method for controlling a display device that divides an image in one field into a plurality of subfields, and that performs a gradation display using the plurality of subfields, the method comprising:

calculating the amount of pseudo-contour noise according to the method of claim 13; and reducing the pseudo-contour noise in an area based on the calculated amount of the pseudo-contour noise.

19. A method for controlling a display device that divides an image in one field into a plurality of subfields, and that performs a gradation display using the plurality of subfields, the method comprising:

calculating the amount of pseudo-contour noise according to the method of claim 14; and reducing the pseudo-contour noise in an area that has a possibility of occurrence of the pseudo-contour noise based on the calculated amount of the pseudo-contour noise.

* * * * *

UNITED STATES PATENT AND TRADEMARK OFFICE
CERTIFICATE OF CORRECTION

PATENT NO.   : 6,812,932 B2
DATED        : November 2, 2004
INVENTOR(S)  : M. Kasahara et al.

It is certified that error appears in the above-identified patent and that said Letters Patent is hereby corrected as shown below:

<u>Title page,</u>
Item [30], Foreign Application Priority Data, should read as follows:
-- Japan        9-340428      12/10/1997
Japan           10-272020     09/25/1998 --

Signed and Sealed this

Fifth Day of April, 2005

JON W. DUDAS
*Director of the United States Patent and Trademark Office*